(12) United States Patent
Dollin et al.

(10) Patent No.: US 6,594,783 B1
(45) Date of Patent: Jul. 15, 2003

(54) CODE VERIFICATION BY TREE RECONSTRUCTION

(75) Inventors: Christopher J Dollin, Yate Bristol (GB); Steven Frederick Knight Leach, North Somerset (GB); Roy T. Oberhauser, Santa Clara, CA (US); Laura J. Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/384,812

(22) Filed: Aug. 27, 1999

(51) Int. Cl.[7] ................................................. G06F 11/00
(52) U.S. Cl. ............................................. 714/38; 717/8
(58) Field of Search .............................. 714/38, 39, 47, 714/26, 25; 717/8–10, 7, 5

(56) References Cited

U.S. PATENT DOCUMENTS

| | | | | |
|---|---|---|---|---|
| 5,317,509 A | * | 5/1994 | Caldwell | 364/419.08 |
| 5,546,522 A | * | 8/1996 | Nishida et al. | 395/156 |
| 5,668,999 A | | 9/1997 | Gosling | 395/704 |
| 5,740,441 A | | 4/1998 | Yellin et al. | 395/704 |
| 5,748,964 A | | 5/1998 | Gosling | 395/705 |
| 5,812,851 A | * | 9/1998 | Levy et al. | 395/705 |
| 5,963,739 A | * | 10/1999 | Homeier | 395/704 |
| 6,061,513 A | * | 5/2000 | Scandura | 395/701 |
| 6,110,226 A | * | 8/2000 | Bothner | 717/7 |
| 6,314,562 B1 | * | 11/2001 | Biggerstaff | 717/9 |

OTHER PUBLICATIONS

Timobe et al., Device and method for aiding development of application generator, Jan. 12, 2001, NEC Corp., Pub. No. JP02001005655A, pp. 1–1.*

Lim et al., Compiler with generic front end and dynamically loadable back ends, Oct. 2, 1996, Pub. No. EP 000735467A2, Sun Microsystems, pp. 1–1.*

Nakadokoro et al., Program development supporting system, Oct. 18, 1986, Hitachi Ltd, Pub. No. JP361234435A, pp. 1–1.*

Bokowski B et al.: A Front–End for Jave Technical Report B–987–09, XX, XX, Dec. 1998 (Dec. 1998), page complete XP002153552.

Kistler t et al.: "a Tree–Based Alternative to Jave Byte–Codes International Journal of Parallel Programming, Feb. 1999, Plenum, USA"vol. 27, No. 1, pp. 21–33, Xp022009125 ISSN: 0855–7458.

* cited by examiner

Primary Examiner—Nadeem Iqbal

(57) ABSTRACT

A system and method are provided that allow for improved code sequence verification through the use of an abstract syntax tree. This is accomplished by first constructing an abstract syntax tree from the code sequence and then determining whether the abstract syntax tree satisfies a predefined set of conditions indicative of the code sequence being executable on the computer without generating a predefined class of execution errors. The abstract syntax tree is constructed by reassembling the code sequence into a plurality of instructions, combining the instructions into a plurality of blocks, examining the blocks to determine entry points of a plurality of loops, and tagging locations in the series of instructions where control is transferred at the end of each loop. The instructions, blocks, loops and tagged locations are then examined to generate a plurality of control structures (the coarse structure). Finally, the instructions, blocks, loops, tagged locations and control structures are examined to generate a plurality of form expressions (the fine structures).

23 Claims, 31 Drawing Sheets

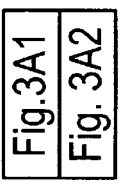

reassembly: bytecodes to instructions validate the exception table to ensure that the entries are properly nested and refer only to instructions within the method (see text)

let labels be the set of all *start* entries in the exception table let byteCodes be the array of bytecode for the method
let pc be the index of the first bytecode
let targets be an empty set of required (pc) target values
let code be an empty sequence of instructions
let finallys be an empty set of pc values is pc greater than the last index of byteCodes ?

yes no

Fig. 3A1

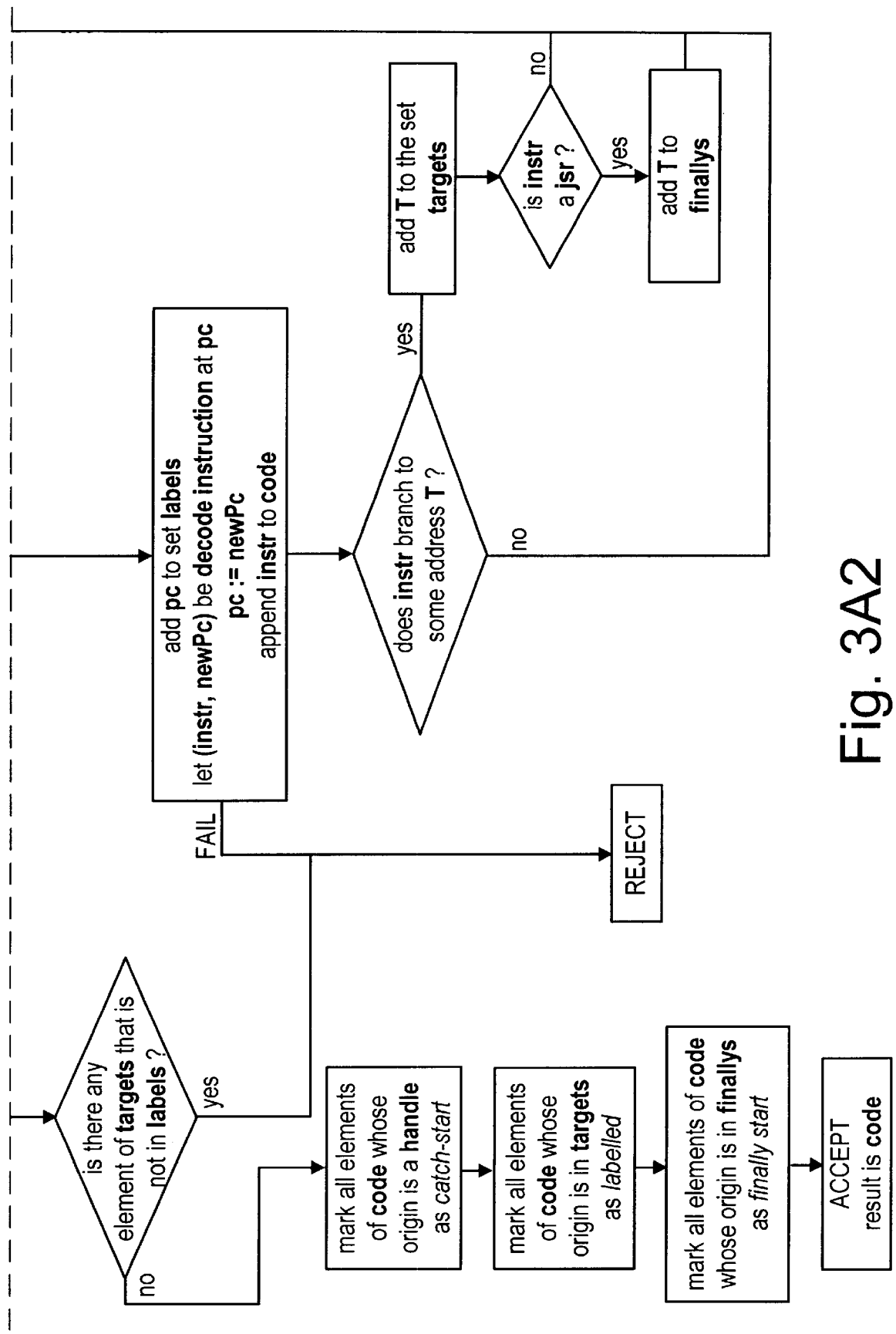
Fig. 3A2

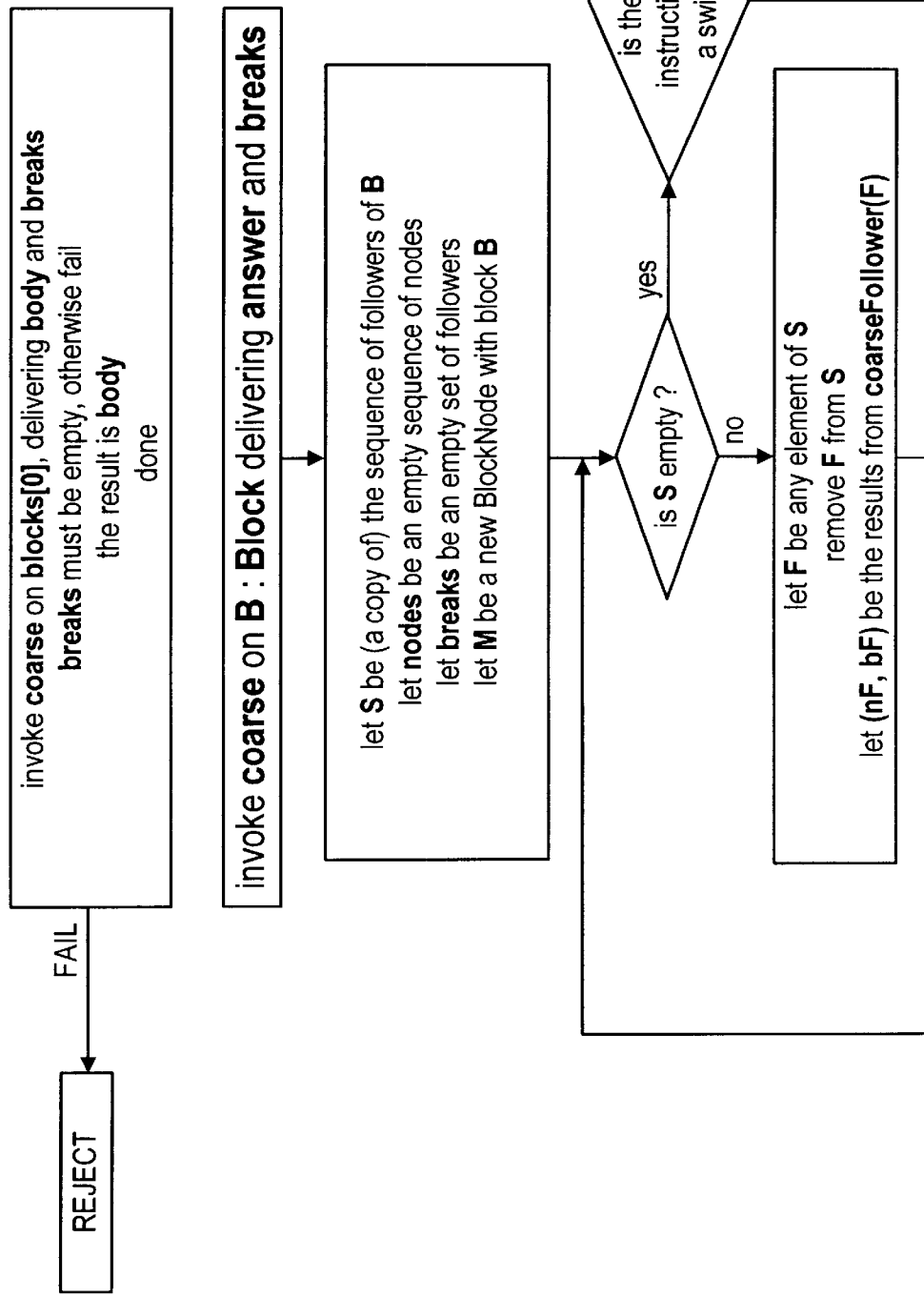
Fig. 7A1

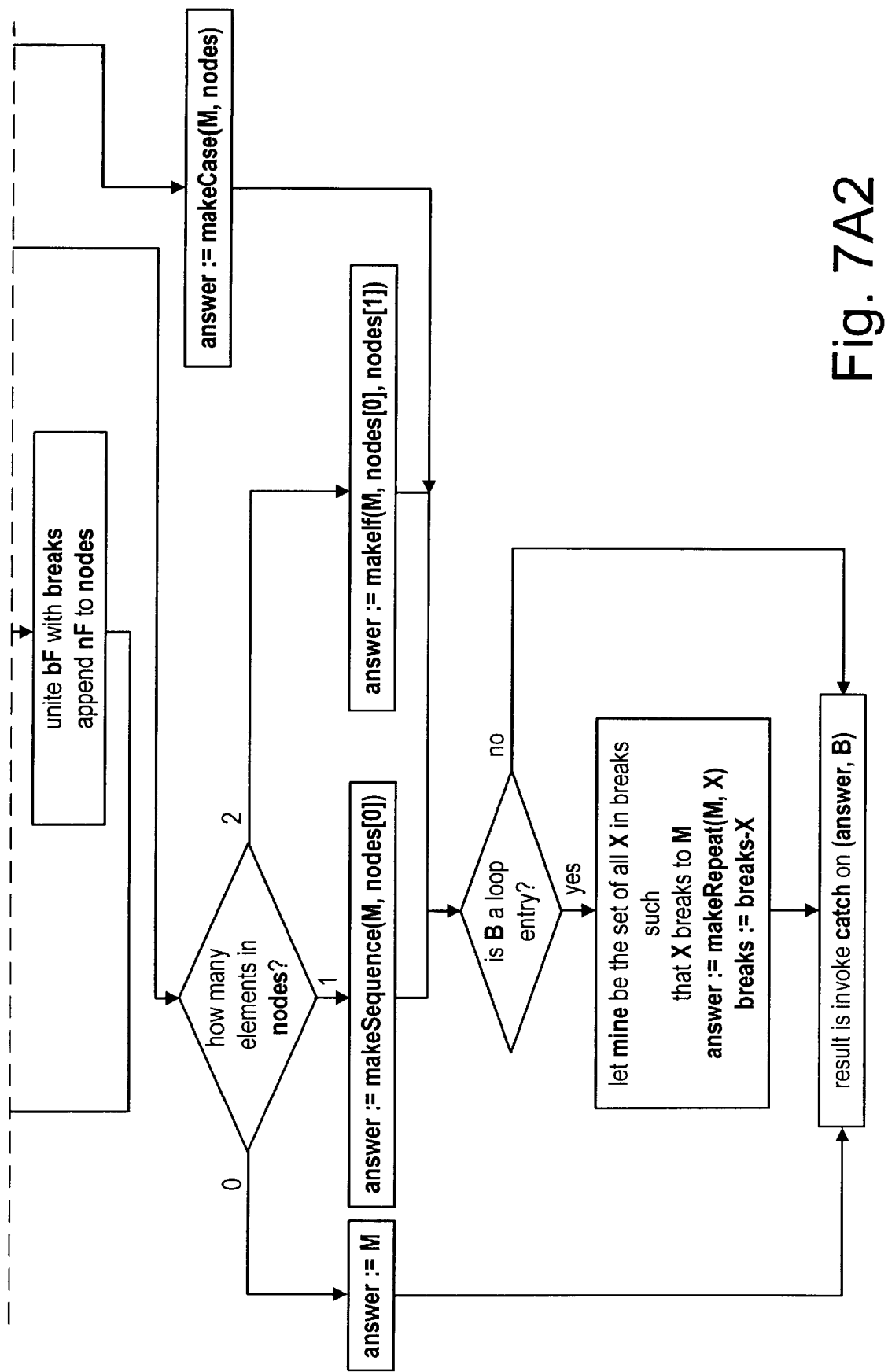
Fig. 7A2

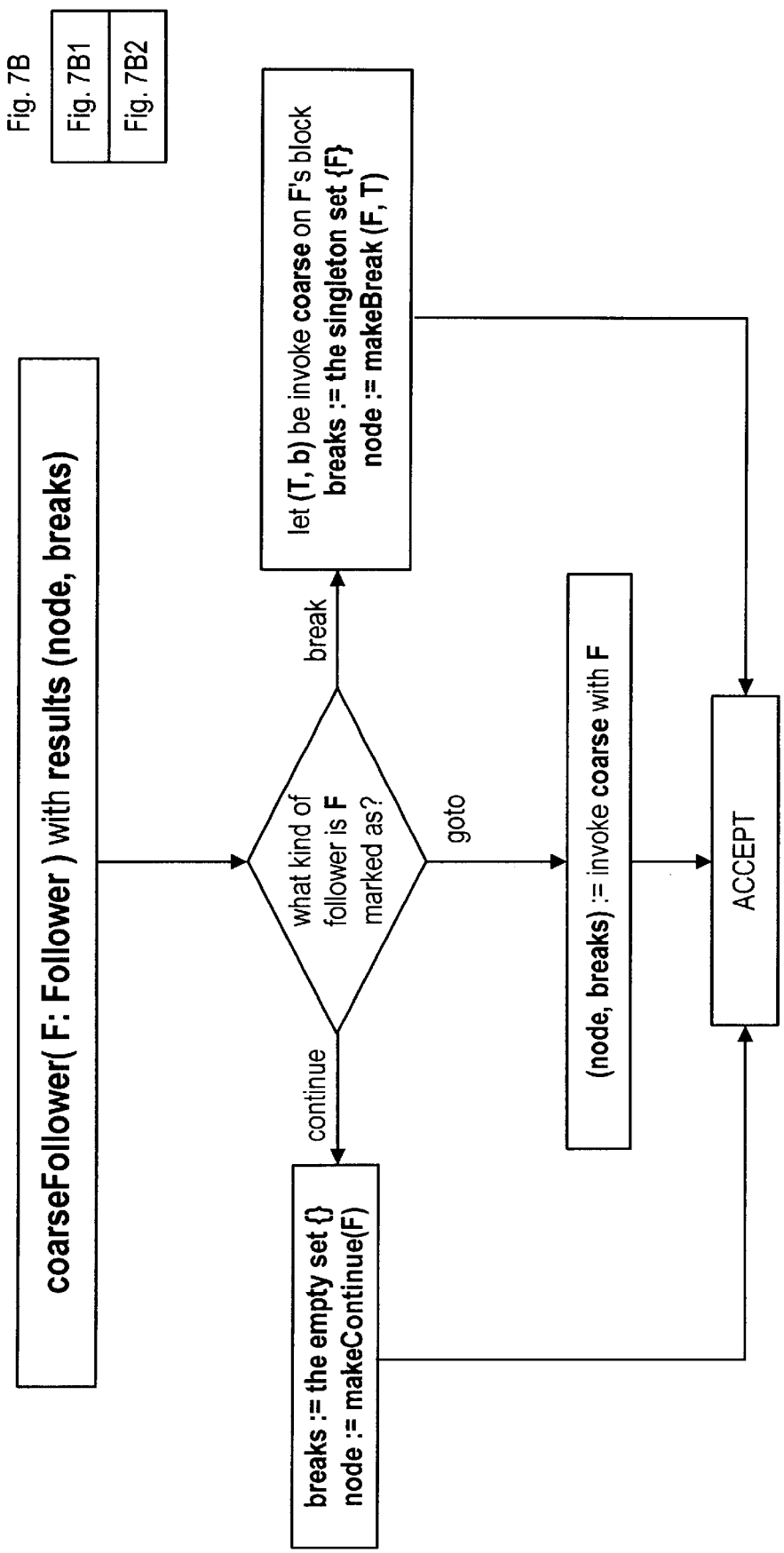
Fig. 7B1

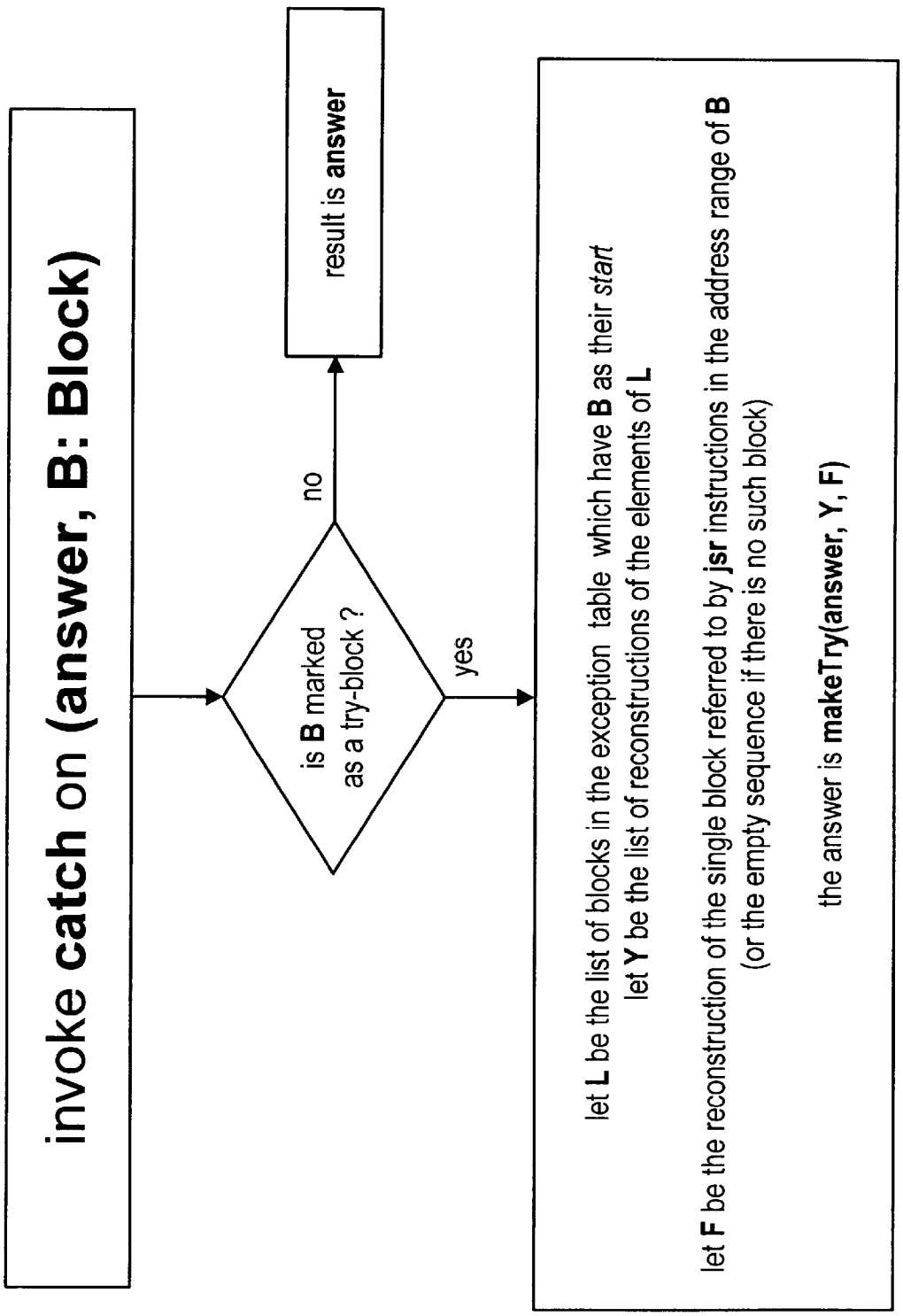
Fig. 7B2

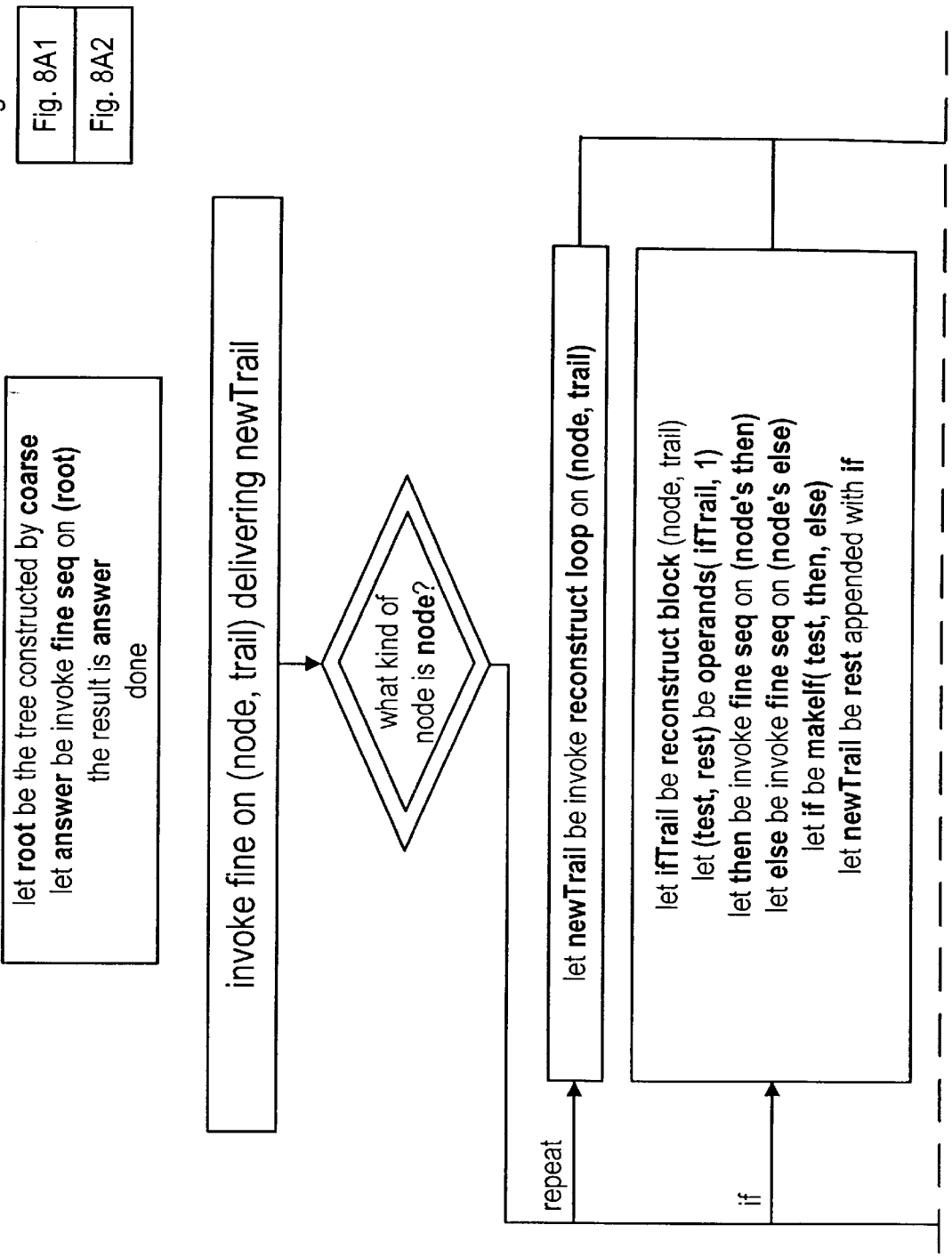

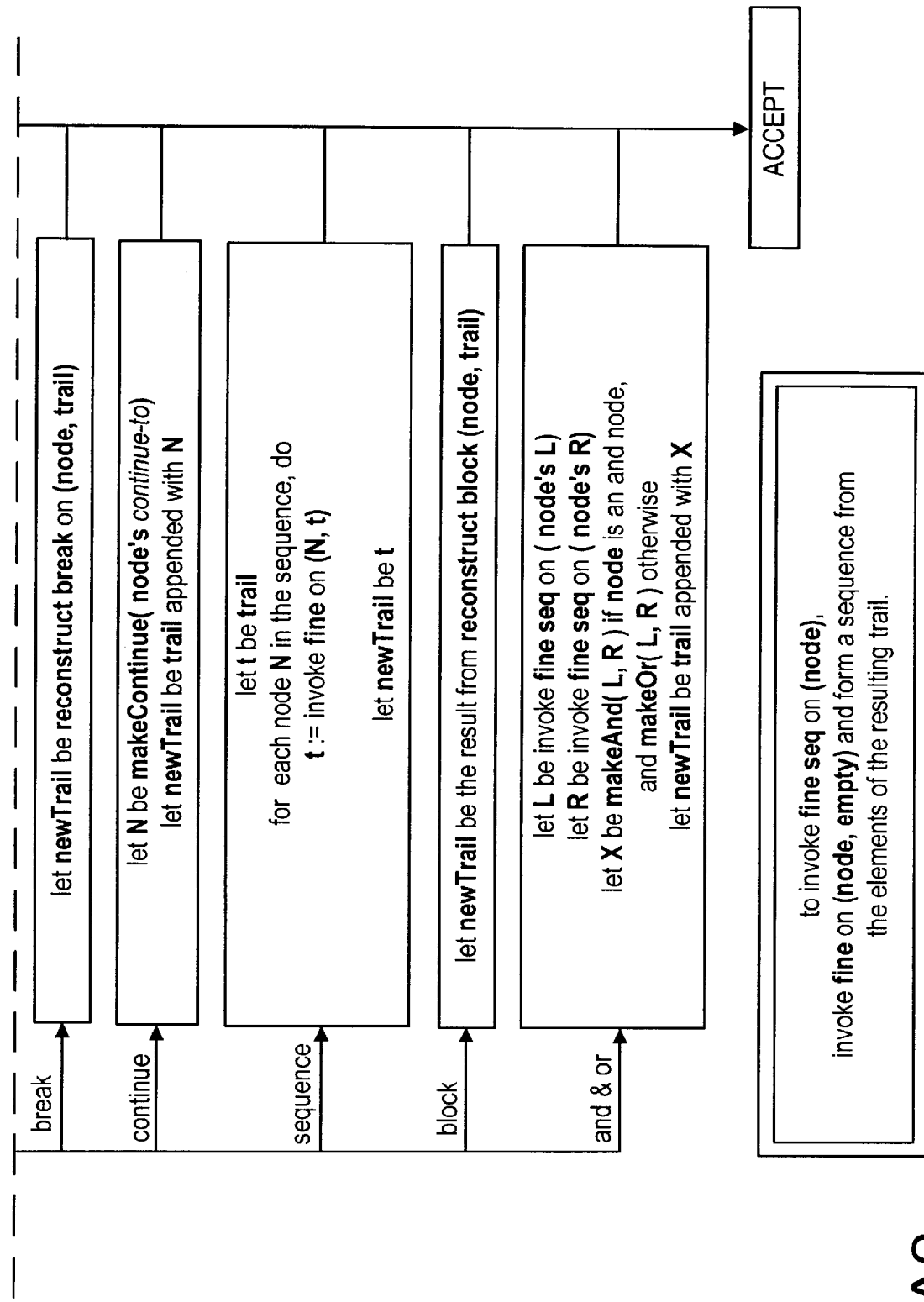
Fig. 8A2

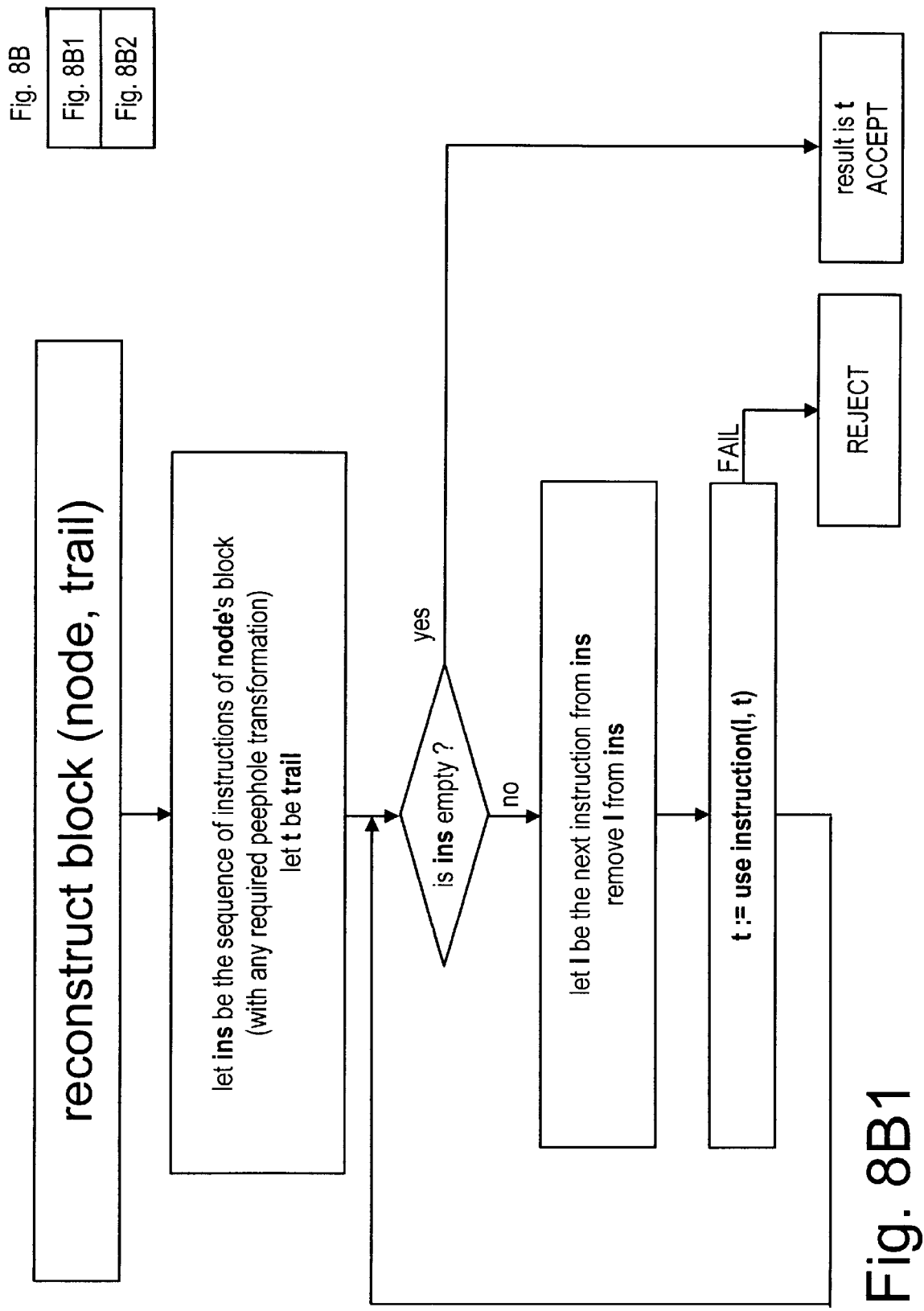
Fig. 8B1

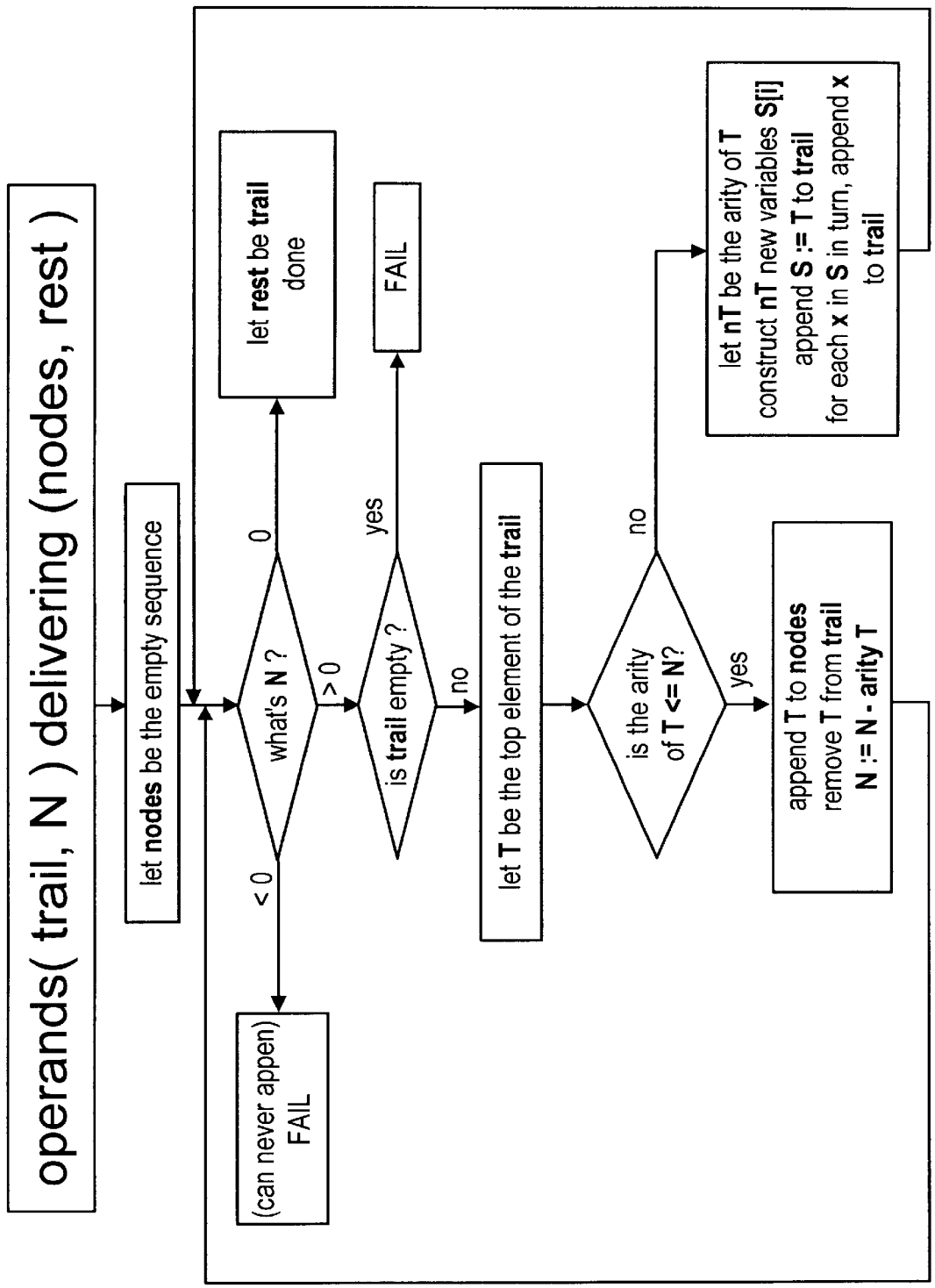
Fig. 8B2

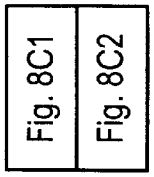

invoke reconstruct loop on (node, trail) delivering newTrail let X be any element of F, if there is one
mark X as *afterwards*
let answer be the result from invoke fine seq on (node's body)
let body be the sequence made from the nodes of answer
let loop be makeLoopNode(body)
let F be node's breaks is F empty?

yes → let newTrail be trail appended with loop no → let B be X's code
let S be makeSequence(loop, B)
let newTrail be trail appended with S result is newTrail ACCEPT

Fig. 8C1

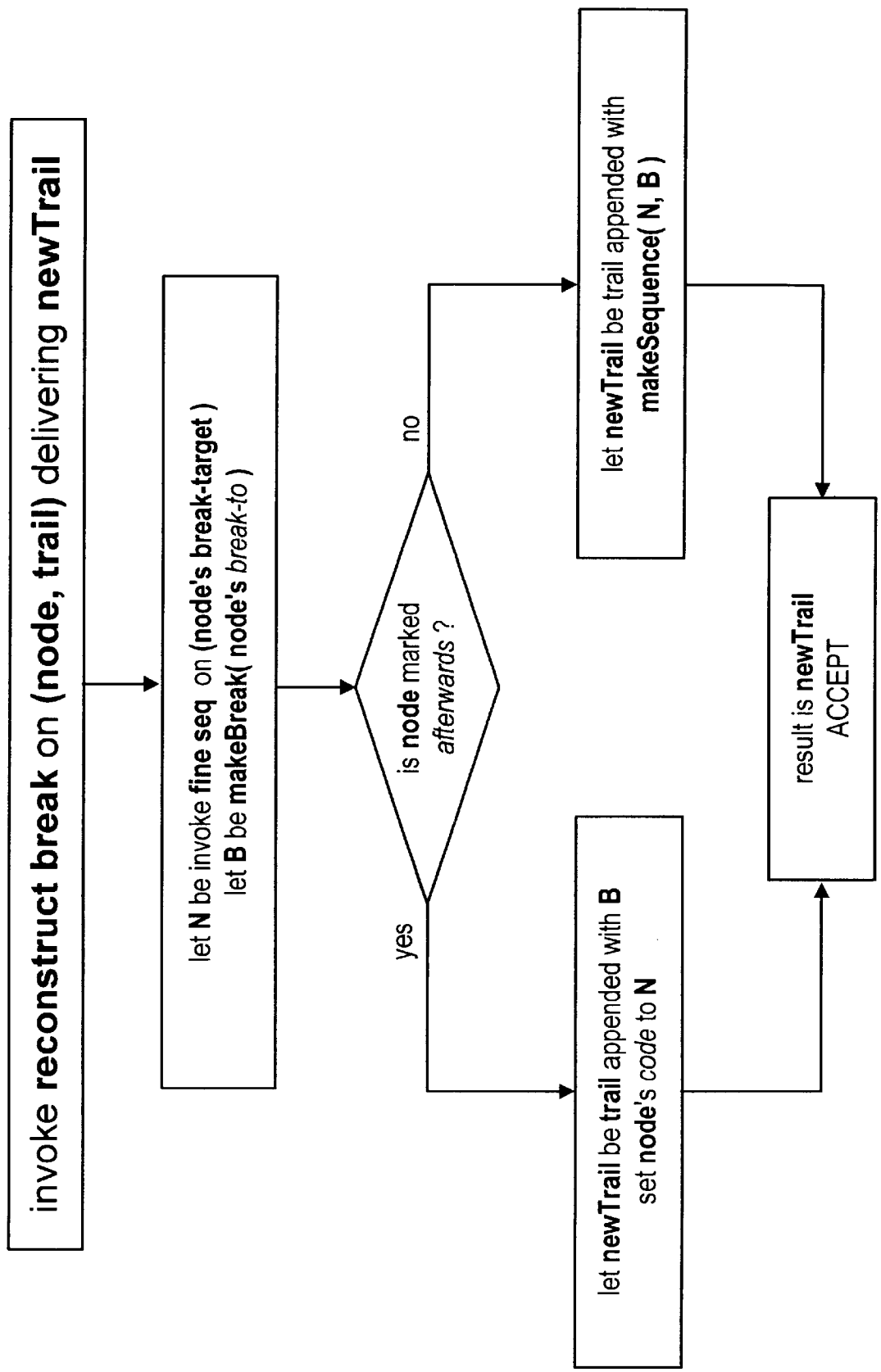
Fig. 8C2

```
public class Custom Test
{
    public static void main (String[] args)
    {
        outer:  for(int i = 0; i < 10; i++) {
            for(int j = 0; j < 10; j++) {
                for(int j = 0; j < 10; j++) {
                    if( i < 5 )
                        continue;
                    if( i == 6 )
                        continue outer;
                    if( i == 8 )
                        break outer;
                    if( i ==7 )
                        break;
                }
            }
        }
    }
}
```

Fig. 10

```
main
0(0):    inconst_0
1(1):    istore_1
2(2):    Branch:goto    57
5(3):    inconst_0
6(4):    istore_2
7(5):    Branch:goto    48
10(6):   iload_1
11(7):   iconst_5
12(8):   Branch:if_icmpge 18 15
15(9):   Branch:goto 45
18(10):  iload_1
19(11):  bipush
21(12):  Branch:if_icmpne 27 24
24(13):  Branch:goto 45
27(14):  iload_1
28(15):  bipush
30(16):  Branch:if_icmpne 36 33
33(17):  Branch:goto 63
36(18):  iload 1
37(19):  bipush
39(20):  Branch:if_icmpne 45 42
42(21):  Branch:goto 54
45(22):  iinc
48(23):  iload_2
49(24):  bipush
51(25):  Branch:if_icmplt 10 54
54(26):  iinc
57(27):  iload_1
58(28):  bipush
60(29):  Branch:if_icmpt 5 63
63(30):  Branch:return
```

Fig. 11A

Block   0(3)->57G
Block   5(3)->48G L:57
Block   10(3)->18G, 15G L:57, 48
Block   15(1)->45G L:57, 48
Block   18(3)->27G, 24B L:57, 48
Block   24(1)->54G L:57
Block   27(3)->36G, 33B L:57, 48
Block   33(1)->63G
Block   36(3)->45G, 42B L:57, 48
Block   42(1)->54G L:57
Block   45(1)->48R L:57, 48
Block   48(3)->10G, 54B L:57, 48 Via:18, 10, 48, 15, 45, 36, 27
Block   54(1)->57R L:57
Block   57(3)->5G, 63B L:57 Via:45, 36, 27, 54, 18, 10, 42, 5, 57, 24, 48, 15
Block   63(1)

Fig. 11B

0. - SeqNode
1. | -RawBlockNode (0)
2. | - LoopNode   (57 brks=63, 33)
3. | % - IfNode
4. | % | - RawBlockNode (57)
5. | % | - SeqNode
6. | % | % - RawBlockNode (5)
7. | % | % - LoopNode (48 brks=54, 24, 42)
8. | % | % | - IfNode
9. | % | % | % - RawBlockNode (48)
10. | % | % | % - IfNode
11. | % | % | % | - RawBlockNode (10)
12. | % | % | % | - IfNode
13. | % | % | % | % - RawBlockNode (18)
14. | % | % | % | % - IfNode
15. | % | % | % | % | - RawBlockNode (27)
16. | % | % | % | % | - IfNode
17. | % | % | % | % | % - RawBlockNode (36)
18. | % | % | % | % | % - SeqNode
19. | % | % | % | % | % | - RawBlockNode (45)
20. | % | % | % | % | % | - ContinueNode (Loop=48)
21. | % | % | % | % | %  - BreakNode (Loop=48 Target=42)
22. | % | % | % | % |  - BreakNode (Loop=57 Target=33)
23. | % | % | % | %  - BreakNode (Loop=48 Target=24)
24. | % | % | % | - SeqNode
25. | % | % | % | %  - RawBlockNode (15)
26. | % | % | % | %  - RawBlockNode (45)
27. | % | % | % | %  - ContinueNode (Loop=48)
28. | % | % | %  - BreakNode (Loop=48 Target=54)
29. | % | - BreakNode (Loop=57 Target=63)

Fig. 11D

```
 0. -SeqNode
 1.    I - AssignOpNode [ : = ]
 2.    I % - LocalIDNode ( 1 int )
 3.    I % - LiteralNode ( 0 int )
 4.    I - LoopNode ( 57 brks = 63, 33 )
 5.    I % - IfNode
 6.    I % I - DyadicNode [ < ]
 7.    I % I % - LocalIDNode ( 1 int )
 8.    I % I % - LiteralNode ( 10 int )
 9.    I % I - SeqNode
10.    I % I % - AssignOpNode [ : = ]
11.    I % I % I - LocalIDNode ( 2 int )
12.    I % I % I - LiteralNode ( 0 int )
13.    I % I % - LoopNode ( 48 brks = 54, 24, 42 )
14.    I % I % I - IfNode
15.    I % I % I % - DyadicNode [ < ]
16.    I % I % I % I - LocalIDNode ( 2 int )
17.    I % I % I % I - LiteralNode ( 10 int )
18.    I % I % I % - IfNode
19.    I % I % I % I - DyadicNode [ > = ]
20.    I % I % I % I % - LocalIDNode ( 1 int )
21.    I % I % I % I % - LiteralNode ( 5 int )
22.    I % I % I % I - IfNode
23.    I % I % I % I % - DyadicNode [ ! = ]
24.    I % I % I % I % I - LocalIDNode ( 1 int )
25.    I % I % I % I % I - LiteralNode ( 6 int )
26.    I % I % I % I % - IfNode
27.    I % I % I % I % I - DyadicNode [ ! = ]
28.    I % I % I % I % I % - LocalIDNode ( 1 int )
29.    I % I % I % I % I % - LiteralNode ( 8 int )
30.    I % I % I % I % I - IfNode
```

Fig. 11E1

31. | % | % | % | % | % - DyadicNode [ ! = ]
32. | % | % | % | % | % | - LocalIDNode ( 1 int )
33. | % | % | % | % | % | - LiteralNode (7 int )
34. | % | % | % | % | % - SeqNode
35. | % | % | % | % | % | - AssignOpNode [ + = ]
36. | % | % | % | % | % | % - LocalIDNode ( 2 int )
37. | % | % | % | % | % | % - LiteralNode ( 1 int )
38. | % | % | % | % | % | - ContinueNode ( Loop = 48 )
39. | % | % | % | % | % - SeqNode
40. | % | % | % | % | % | - AssignOpNode [ + = ]
41. | % | % | % | % | % | % - LocalIDNode ( 1 int )
42. | % | % | % | % | % | % - LiteralNode ( 1 int )
43. | % | % | % | % | % | - ContinueNode ( Loop = 57 )
44. | % | % | % | % | - BreakNode ( Loop = 57  Target = 33 )
45. | % | % | % | % - SeqNode
46. | % | % | % | % | - AssignOpNode [ + = ]
47. | % | % | % | % | % - LocalIDNode ( 1 int )
48. | % | % | % | % | % - LiteralNode ( 1 int )
49. | % | % | % | % | - ContinueNode ( Loop = 57 )
50. | % | % | % | - SeqNode
51. | % | % | % | % - AssignOpNode [ + = ]
52. | % | % | % | % | - LocalIDNode ( 2 int )
53. | % | % | % | % | - LiteralNode ( 1 int )
54. | % | % | % | % - ContinueNode ( Loop = 48 )
55. | % | % | % - BreakNode ( Loop = 48  Target = 54 )
56. | % | % - AssignOpNode [ + = ]
57. | % | % | - LocalIDNode ( 1 int )
58. | % | % | - LiteralNode ( 1 int )
59. | % | % - ContinueNode ( Loop = 57 )
60. | % | - BreakNode ( Loop = 57  Target = 63 )

Fig. 11E2

0. - $1 := 0
1. - loop ( 57 )
2. I - if ( $1 < 10 ) then
3. I % - $2 := 0
4. I % - loop ( 48 )
5. I % I - if ( $2 < 10 ) then
6. I % I % - if ( $1 >= 5 ) then
7. I % I % I - if ( $1 != 6 ) then
8. I % I % I % - if ( $1 != 8 ) then
9. I % I % I % I -if ( $1 != 7 ) then
10. I % I % I % I % - $2 += 1
11. I % I % I % I % - continue 48
12. I % I % I % I - else
13. I % I % I % I % - $1 += 1
14. I % I % I % I % - continue 57
15. I % I % I % I - endif
16. I % I % I % - else
17. I % I % I % I - break 57 to 33
18. I % I % I % - endif
19. I % I % I - else
20. I % I % I % - $1 += 1
21. I % I % I % - continue 57
22. I % I % I - endif
23. I % I % -else
24. I % I % I - $2 += 1
25. I % I % I - continue 48
26. I % I % - endif
27. I % I - else
28. I % I % - break 48 to 54
29. I % I - endif
30. I % - endloop
31. I % - $1 += 1
32. I % - continue 57
33. I - else
34. I % - break 57 to 63
35. I - endif
36. - endloop

Fig. 11F

CODE VERIFICATION BY TREE RECONSTRUCTION

BACKGROUND OF THE INVENTION

1. Field of the Invention

The invention relates generally to the verification of computer code and, more particularly, to the verification of a code sequence.

2. Related Art

Verification allows computer code from an unknown and potentially untrusted source to be executed on a trusted computer platform avoiding certain classes of potentially serious execution errors. Verification is typically not required for commercially distributed software that is certified by the manufacturer or distributor for "safe" execution on a particular computer platform. Similarly, computer code distributed in source form and compiled locally (i.e., on the machine on which it is to be executed), typically does not require verification as error detection can be performed as part of the compilation process.

However, the increased availability of portable compiled code brought about by the increasing popularity of the Internet and the World Wide Web has made code verification an important concern for on-line users. The JAVA programming language, for example, is intended to provide single source computer code executable on a variety of hardware platforms, provided that a JAVA Virtual Machine (JVM) is present on the platform to interpret JAVA bytecodes into the instruction set of the specific hardware platform. While such characteristics make JAVA an ideal platform for code distributed over the Internet, they also render verification of code downloaded over the Internet a primary concern to ensure users' security on individual platforms.

While verification can be performed at run time, the resulting performance penalty is undesirable for most purposes. Sun's solution to JAVA bytecode verification relies on a technique known as symbolic execution. Symbolic execution, however, presents a number of limitations. First, all possible execution paths in the code must be verified, just in case that portion of the code is exercised at run time. Second, symbolic execution maintains little or no state information about the structure of the code being verified. As a result, when multiple execution paths split and rejoin all possible states of each of the paths must be accounted for. Similarly, loops need to be symbolically executed multiple times if invoked in different code sequences. As a result, symbolic execution is hard to implement and is inherently dependent on a specific bytecode instruction set.

In addition, the only information derived from the symbolic execution process is whether a specific bytecode sequence is accepted or rejected.

SUMMARY OF THE INVENTION

The system and method of the present invention allow for improved code sequence verification through the use of an abstract syntax tree. This is accomplished by first constructing an abstract syntax tree from the code sequence and then determining whether the abstract syntax tree satisfies a predefined set of conditions indicative of the code sequence being executable on the computer without generating a predefined class of execution errors.

The abstract syntax tree is constructed by reassembling the code sequence into a plurality of instructions, combining the instructions into a plurality of blocks, examining the blocks to determine entry points of a plurality of loops, and tagging locations in the series of instructions where control is transferred at the end of each loop. The instructions, blocks, loops and tagged locations are then examined to generate a plurality of control structures (the coarse structure). Finally, the instructions, blocks, loops, tagged locations and control structures are examined to generate a plurality of form expressions (the fine structures).

Since the abstract syntax tree closely approximates the structure of the source code from which the code sequence was generated, the system and method of the present invention overcome the limitations of the prior art. Once the abstract syntax tree has been constructed, verification can be conducted in a more straightforward manner. Since the abstract syntax tree provides more extensive state information, only the tree and not every single path through the code need to be verified. Furthermore, verification on the abstract syntax tree is largely independent from the specific bytecode instruction set.

In addition, since the abstract syntax tree provides the structure of the code sequence, code segments can be inserted into the code sequence to perform additional functions at run time without requiring access to the source code or recompilation.

BRIEF DESCRIPTION OF THE DRAWINGS

FIGS. 3A–3B are flow diagrams of the reassembly operation of FIG. 2.

FIGS. 7A–7B are flow diagrams of the coarse structure formation operation of FIG. 2.

FIGS. 8A–8C are flow diagrams of the fine structure formation operation of FIG. 2.

FIG. 10 shows source code for an embodiment of the code sequence of FIG. 1B.

FIG. 11A shows a sequence of instructions generated from the code sequence of FIG. 10.

FIG. 11B shows a series of blocks extracted from the sequence of instructions of FIG. 11A.

FIG. 11D is a coarse tree structure extracted from the instructions of FIG. 11A, the blocks of FIG. 11B and the graph of FIG. 11C.

FIG. 11E is a verbose fine tree structure extracted from the instructions of FIG. 11A, the blocks of FIG. 11B, the graph of FIG. 11C and the coarse tree of FIG. 11D.

FIG. 11F is a fine tree structure extracted from the instructions of FIG. 11A, the blocks of FIG. 11B, the graph of FIG. 11C, the coarse tree of FIG. 11D and the verbose fine tree of FIG. 11E.

DETAILED DESCRIPTION OF THE INVENTION

Figure 1A:
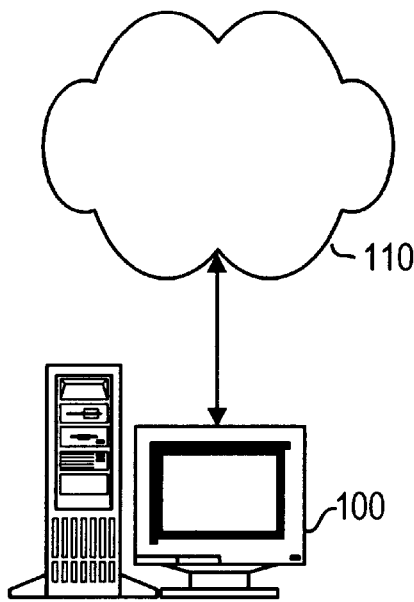
FIG. 1A is a block diagram of a computer system in accordance to an embodiment of the invention.
Figure 1B:
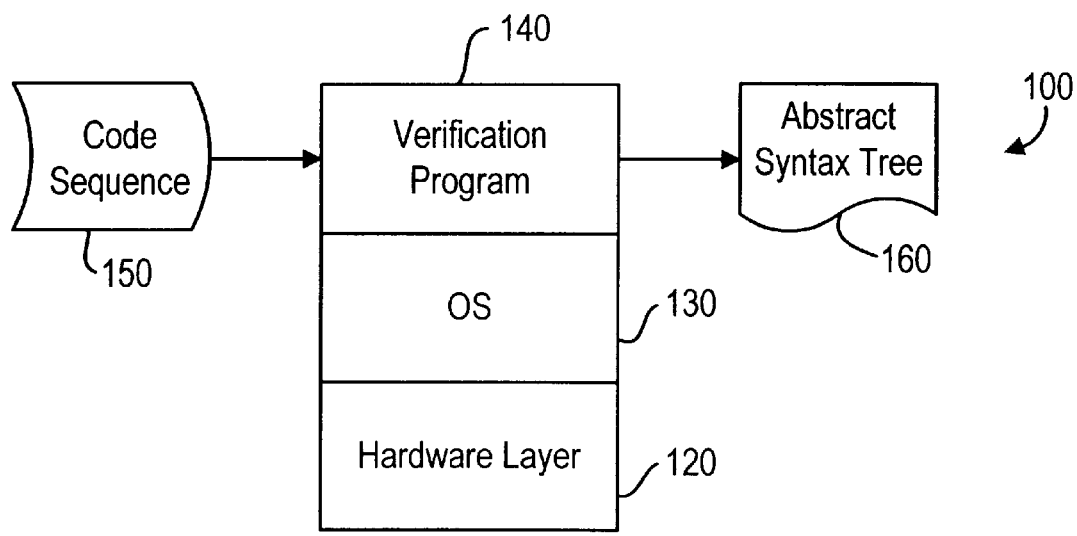
FIG. 1B is a block diagram of the hardware/software structure of the computer system of FIG. 1A.

A computer system in accordance to an embodiment of the invention is shown in FIG. 1A. In FIG. 1A, computer system 100 is connected to Internet 110 for uploading/downloading computer programs to and from other computers connected to Internet 110 (not shown). FIG. 1B illustrates the hardware/software structure of computer system 100. As shown in FIG. 1B, computer system 100 includes an hardware layer 120 providing a physical connection to Internet 110, an operating system 130 executed by hardware layer 110 and a verification program 140, executed by hardware layer 110 in top of operating system 130. Hardware layer 120 may be connected to Internet 110 using any technique known in the art, such as a dial-up connection, a direct network connection or a network connection established via one or more servers/routers.

Verification program 140, in turn, receives a code sequence 150 and generates an abstract syntax tree 160. In some embodiments, code sequence 150 is downloaded onto computer system 100 from a remote computer connected to computer system 100 over Internet 110. Those skilled in the art, however, realize that code sequence 150 can originate from sources external to computer system 100 other than Internet 110 (e.g., disc files, servers on a LAN,etc.). Accordingly, the invention is not limited to any particular source of code sequence 150.

Code sequence 150 is a sequence of zero or more instructions. An instruction consists of an operator and a sequence of zero or more operands, where the operator specifies an operation to be executed by computer system 100 and an operand specifies a value to be used by the operation. An operand may specify a location in the machine's store, or in the code sequence, and the operation may require that locations contain the correct type of value, otherwise the operation has an undefined effect or causes a type error when the instruction is executed.

Verification is the process of inspecting the code sequence or information derived from that sequence to determine that no errors or undefined behavior, as described above, can occur at run-time. The inspection is conducted prior to execution of code sequence 150 is executed. If the verification process fails, code sequence 150 is not executed to prevent errors and/or undefined behavior.

An abstract syntax tree (AST) is a collection of tagged nodes where each node is either a leaf, bearing tag-specific information, or a branch, bearing a sequence of zero or more nodes according to its tag. The AST is a syntax tree because it represents the structure of a piece of program code. The AST is abstract because it does not specify the punctuation, keywords, etc found in source programs, but only the sub-components of each structure and the way in which they are combined.

Each AST corresponds to a number of code sequences which implement the AST, in the sense that the execution of code sequence 150 has the same meaning as that of a corresponding AST. Further, a number of closely corresponding code sequences implement an AST. These code sequences can be derived from the AST by recursive composition (i.e., the code sequence for a node is derived by combining the code sequences for its sub-nodes) plus some number of modification operations that preserve the meaning of the code sequence but may improve the properties of the code sequence.

A node represents a program construct that consumes some number of values (arising from the construct's operands) and delivers some number of results (which will be used by the node of which the construct is a part).

The in-arity of a node is the number of values it consumes. The out-arity of a node is the number of results it delivers. A node is said to be void if its out-arity is 0. The arity of a node is often known in advance of any execution, in which case the node is said to have static [in-, out-] arity.

The expression inArity(x) denotes the in-arity of a node or tag x. The expressing outArity(x) denotes the out-arity of a node or tag x. For the purposes of this application, an arity is presumed to be a natural umber. However, other arities can also be used:

A range arity N . . . M, denoting something that may be as few as N values or as many as M values.

An indefinite arity N . . . , denoting N or more values.

A function arity A->B, where A and B are arities, representing a single value which is a function with in-arity A and out-arity B.

Reconstruction is the systematic discovery of an AST that closely corresponds to a given code sequence. If such an AST is found, the AST verified to determine that the execution of the AST would not give rise to undefined behavior or type errors. Such verification serves also to verify the code-sequence from which the AST is reconstructed.

Code sequence 150 consists of instructions which operate on local variables L (including machine registers), permanent (i.e., global or static) variables V, constants C, labels H, and procedures (also referred to as functions or methods) P. Machine state may include a stack capable of holding arbitrary (possibly typed) machine values.

Instructions include, but are not limited to, the following:

push T X, where X is a variable or constant and T is the type of the instruction. This is legal only if X has a type suitable for T, and there is enough room on the stack to hold a value of type T.

pop T X, where X is a variable and T the type of the instruction. This is legal only if there is a value on the stack to remove, and X has type suitable to receive values of type T.

goto H, unconditional transfer of control to location (label) H.

op $T^*_x$ $T^*_y$, where op is an operator with in-arity x and out-arity y. The T* are the types expected and delivered. The values are taken from (and delivered to) the stack; it is illegal if the values on the stack are not of type $T^*_x$.

if2 T R H, conditional transfer of control. Two values of type T are taken from the stack and tested using relation R (e.g., ==, <, etc); if the relation is true, control is transferred to location H.

call $T_{in}$ P $T_{out}$, procedure call to procedure P requiring arguments of type $T_{in}$ and delivering values of type $T_{out}$. This is illegal if the arguments on the stack are of the wrong type, or if P does not accept arguments of type $T_{in}$ or does not deliver results of type $T_{out}$.

AST Nodes include, but are not limited to:

empty, a leaf node representing empty code, equivalent to the empty sequence.

local L, a leaf node representing local variable L.

global G, a leaf node representing a permanent variable G; G identifies the class it belongs to, if any.

field F, a leaf node representing a field of some data structure or class; F identifiers the class it belongs to as well as the field in that class.

method M, a leaf node representing a method/procedure of some class; M describes the arguments and result type of that method as well as its class and name.

constant K, a leaf node representing a constant value K.

if(T,X,Y), a conditional node with predicate T, then-part X, and else-part Y.

switch(T,C), a switch node with controlling expression T and a collection of cases C; each case is a case node except possibly for one default node.

case(E,X), a case node with a collection of integer constant nodes E and a body node X which is the code to execute when the controlling switch expression has one of the values E. case nodes can only appear in switches.

default(X), a default node with a body X, the code to execute when the controlling switch expression has no value matching one of its cases. default nodes can only appear in switches.

seq(A,B, . . . ), a sequence node representing the execution of A, then B, etc.

repeat(H, X), a repeat node with label H representing the repeated execution of its body X.

continue H, a node representing the immediate re-execution of the body of the loop labelled H; such a node can only appear within the body of a loop so labeled.

break H X, a node representing the immediate exit from the loop labeled H followed by execution of the body X; such a node can only appear within a loop labeled H.

returnwith X, a node representing the immediate exit from a procedure with exit-values X.

return, a leaf node representing the immediate exit from a procedure with no values returned.

throw X, a node representing the immediate exit from a try-block, carrying exceptional value X.

try X $C_1$ . . . $C_n$ finally F, representing an exception-handling block which attempts to execute X and, if it fails, to execute the corresponding handler $C_i$; however the construct is left, F is executed.

dyadic $X_1$ op $X_2$, an dyadic operator expression with operands $X_1$ and $X_2$ and operator op; for example +, −, <=, &&.

monadic op X, an monadic operator expression with operand X and operator op, for example ~, !

dot X F, access to field F of structure [or class] instance X.

subscript A I, access to the Ith element of array value A.

invoke O M A, invoke the method M on object O passing it arguments A; O may be a special value to indicate that M is a so-called static method (a procedure) which does not require an object to dispatch off.

T :=S and T=S, an assignment node which evaluates the source S and assigns it to the target T, which may be a variable, field access, or array indexing. The :=form has no result; the=form returns the assigned result.

T Op=S and T Op:=S, an assignment node which evaluates the source S and the target T (which may be a variable, field access, or array indexing), performs the (dyadic) operation Op on those values, and assigns the result to T. The :=form has no result; the=form returns the assigned result.

cast T E, an expression which evaluates E to some reference value and checks that it is of type T.

convert $T_1$ $T_2$ E, an expression which evaluates E to some (non-reference) value which must be of type $T_1$ and then converts it to a value of type $T_2$.

basicNew C, a placeholder expression which creates an uninitialized instance of the class C.

basicNewArray C N, a placeholder expression which creates an N-element array of references to instance of C, initialized to null.

new E P(A), an expression which evaluates E to some class value, A to some argument values, creates a new instance of the class and initializes it using the constructor P.

new E[$N_1$] . . . [$N_k$], an expression which evaluates E to some type T and the Ni to some natural number(s) and creates a new instance of array T, N1 elements long, initialized to T's default value (if k=1 and T is a primitive type) or to instances from new E[$N^2$] . . . [$N^k$] (otherwise)

double E, which evaluates E and delivers its result; E must be a double-length value. (This is used for type-checking in the presence of dup and its friends.)

single E, which evaluates E and delivers its result; E must be a single-length value. (This is used for type-checking in the presence of dup and its friends.)

Figure 2:
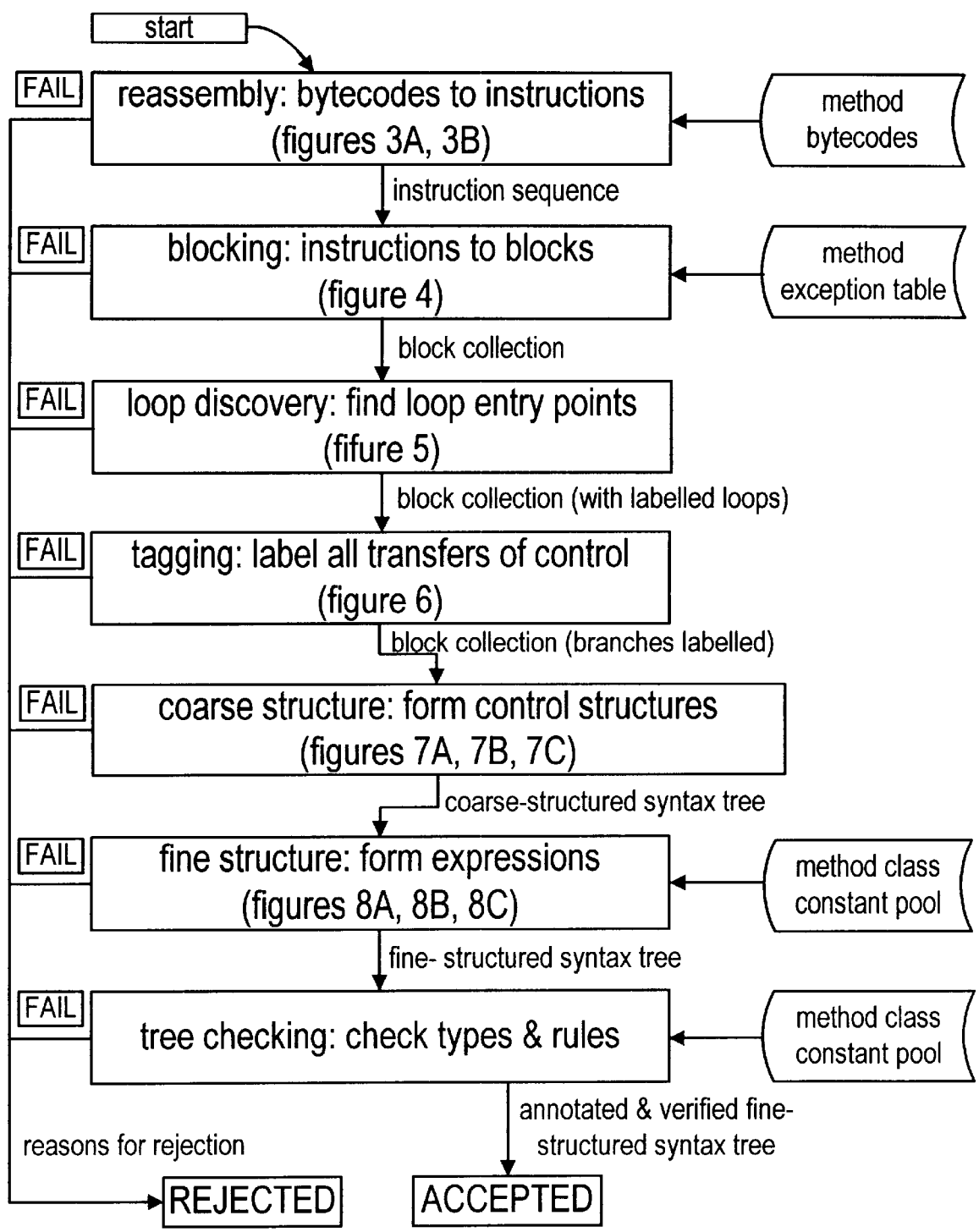
FIG. 2 is a flow diagram of the operation of the verification program of FIG. 1B.

A method for constructing an abstract syntax tree from a stack-oriented instruction set is illustrated in FIG. 2. While the method of FIG. 2 is described as a number of separate passes, for convenience in exposition, alternative embodiments are possible in which one or more of the passes may be combined.

Reconstruction is possible only given a number of assumptions about the structure of the code sequence. These assumptions are plausible if code has been generated by a compiler and not been subject to excessive "optimization" (i.e., code transforms which are difficult or impossible to invert from the code sequence supplied).

Some important assumptions are:

loop bodies have no overall effect on the stack of a stack-based machine.

the number of arguments to a procedure can be discovered by inspecting the stack, the local instruction sequence, or dictionary entries for the called procedure.

the arms of an if do not remove from an operand stack values which were pushed before the test of the if.

Figure 3B:
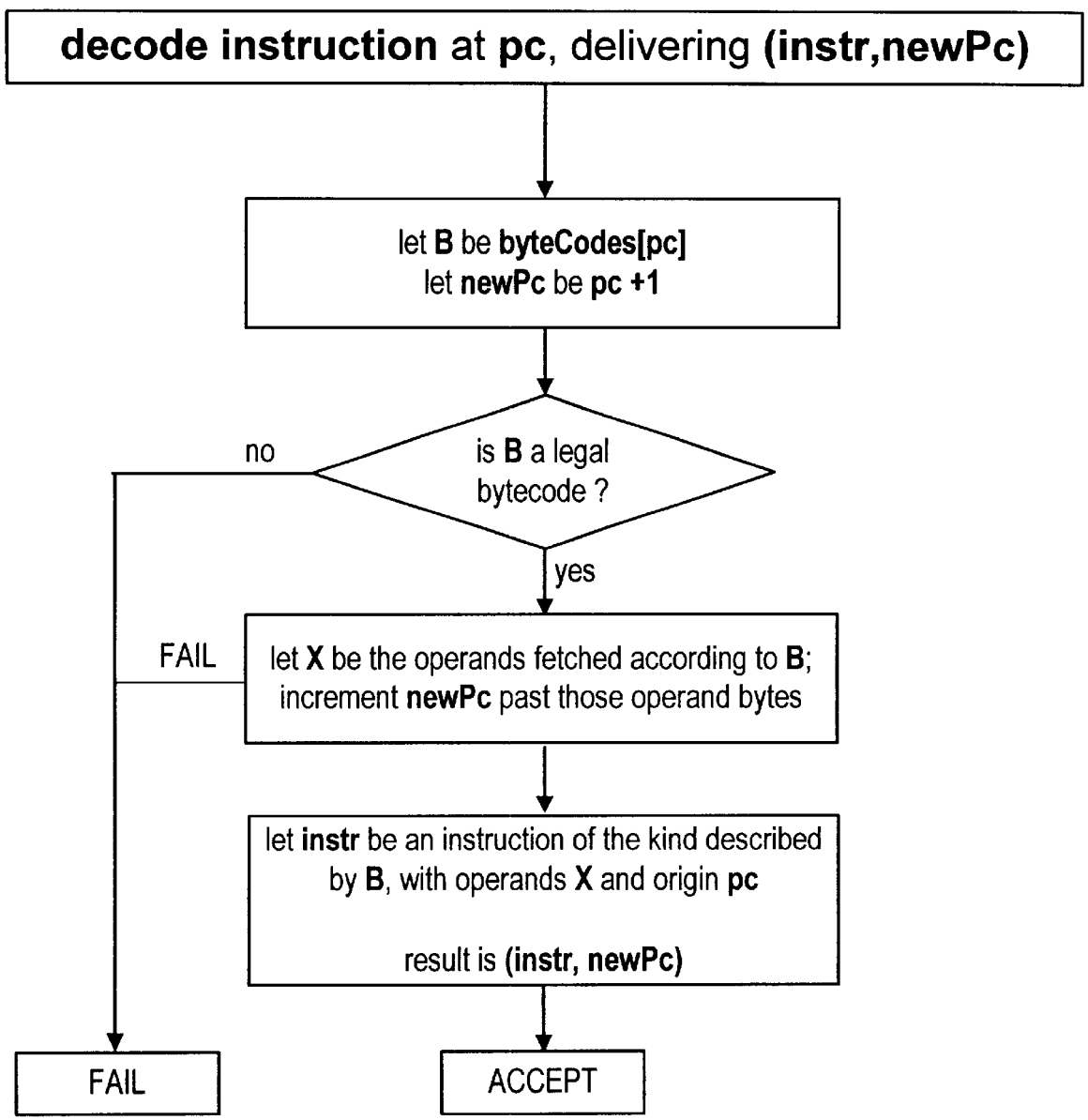

FIGS. 3A and 3B illustrate a reassembly pass of the method of FIG. 2. The reassembly pass turns bytecodes into meaningful instructions.

Code sequence 150 is represented as a sequence of integer values (e.g., a sequence of 8-bit bytes in some computer store). The integer sequence is reassembled into an instruction sequence using the definitions of the machine instructions and assuming that the integer sequence represents a contiguous sequence of instructions.

If any instruction that is defined to refer to another instruction in the same code sequence does not in fact so refer (e.g., it refers to a location outside the code sequence, or to a location within an instruction), or if the integer sequence cannot be reassembled into instructions, the code sequence fails to verify.

The bytecodes may come with an exception table, which is a collection of entries (start, end, handle, class). Each start is the address of a range of bytecodes which are covered by this entry; end is the instruction following the last instruction in that range. (Thus the bytes that fall within the range have addresses (start,end−1)). handle is the address of code to execute if the exception class is raised within that range of code.

If the exception table is invalid, verification fails. To be valid, the exception table must satisfy the following conditions:

start and handle must all refer to addresses in code sequence 150, and end to an address in code sequence 150 or to the address just past code sequence 150.

Two (start, end−1) ranges may overlap only if one completely includes the other. (The −1 allows the ranges to be adjacent.)

Two entries with equal (start, end) pairs cannot have the same class.

This means that the ranges nest properly and that each range has at most one handler for any given class value. Further, there is a constraint on the use of jsr instructions:

All the jsr instructions in a given address range that are not also in some smaller address range must refer to the same address.

This means that each address range has at most one jsr target.

Some instructions in the reassembled sequence are said to be labeled, meaning that control can be transferred directly to those instructions. An instruction is labeled if:

some other instruction branches to it;
it follows a conditional branch instruction;
it is the first instruction in code sequence 150;
it is referred to by a start, end, or handle of an exception table entry.

An instruction referred to by a handle of an exception table entry is marked as a catch start.

Further, the instruction referenced by a start entry is marked as a try start. An instruction referred to by a jsr instruction is marked as a finally start.

Figure 4A:
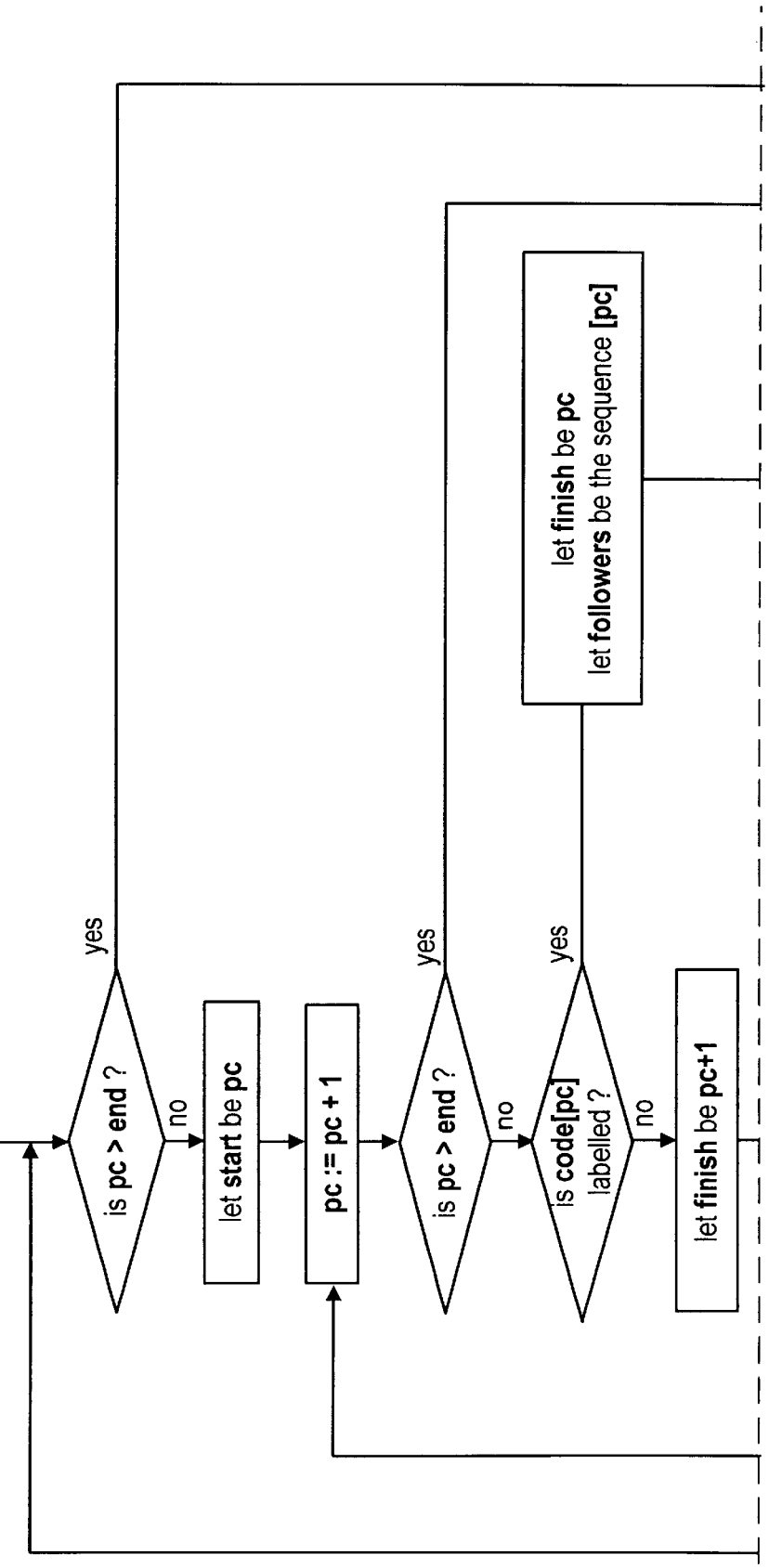
FIG. 4 is a flow diagram of the block detection operation of FIG. 2.
Figure 4B:
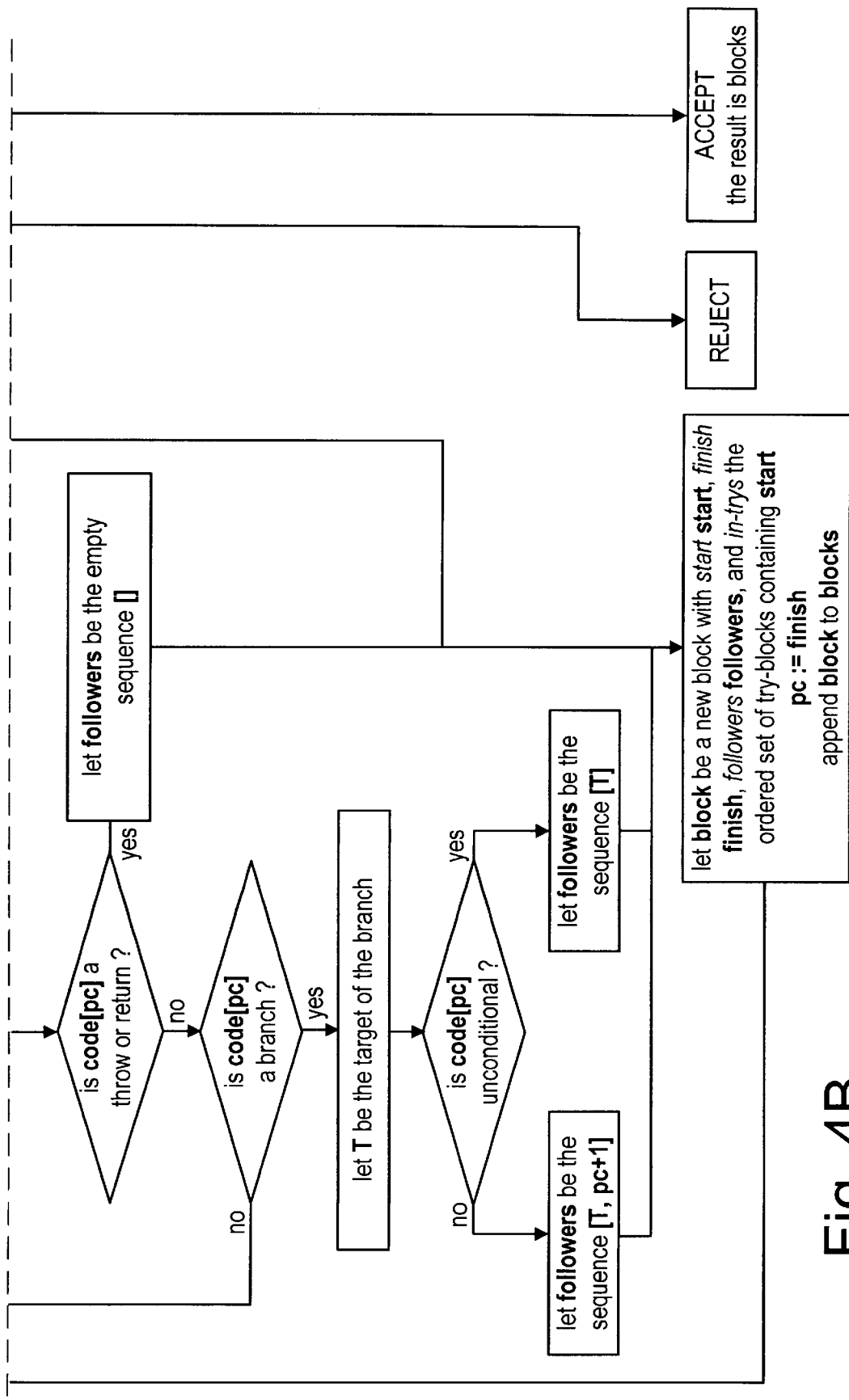

FIG. 4 illustrates a blocking pass of FIG. 2. The blocking pass converts the instruction sequence from the previous pass into a block sequence; blocks are sequences of instructions which start with a labeled instruction and which contain no internal (local) transfers of control or entry points; only the last instruction of a block is permitted to be a transfer of control to another block, or a return or throw.

Each block has a (possibly empty) sequence of followers; each follower is a reference to a block, annotated with the style of the reference (the style is established in the tagging pass, below). The blocks referred to are those that this block transfers control to.

A block has zero followers if it ends with a return or throw instruction; it has one follower if it ends in an unconditional transfer of control to another block, or is followed by a labeled instruction; it has two followers if it ends with a conditional jump to another block, the other follower referring to the block immediately following it in code sequence 150; and it has n followers if it ends with a switch instruction.

The block which starts with the first instruction in the instruction sequence is called the opening block. A block that starts with a try start instruction is marked as a try block.

Every block B is given an in-trys attribute, which is a sequence S of (references to) blocks. All the blocks in S must be try-blocks, B must be in the address-range of all the try-blocks in S, and the sequence must be ordered with the widest range first.

Figure 5:
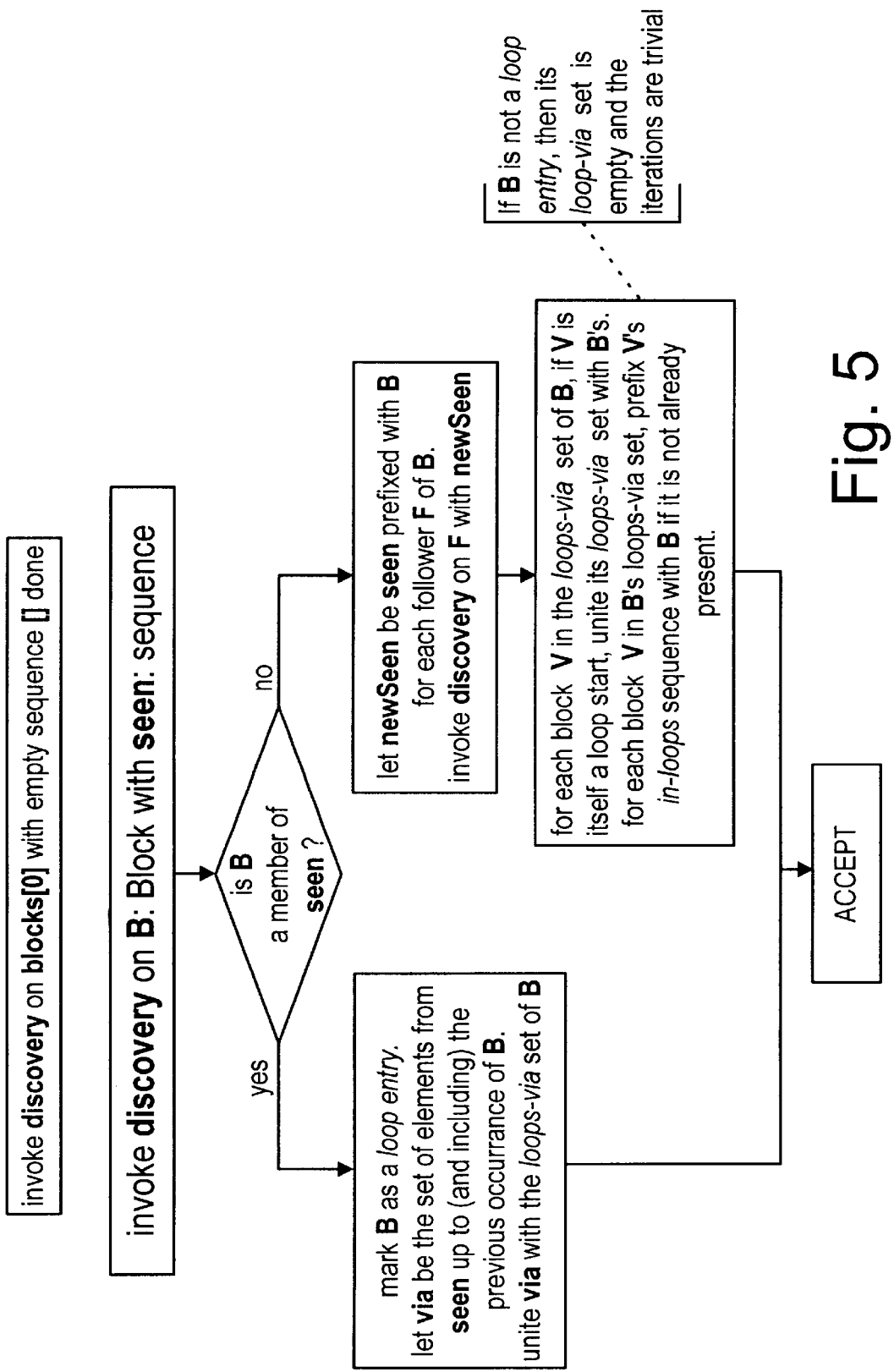
FIG. 5 is a flow diagram of the loop discovery operation of FIG. 2.

FIG. 5 illustrates a loop discovery pass of the method of FIG. 2. The loop discovery pass discovers which blocks are the entry points of loops, and which other blocks participate in those loops.

Each block can be marked as being a loop entry and, if so, will have a set loops-via of blocks that it contains.

The loop discovery process is a recursive walk of the graph of blocks and followers; the depth of the recursion is bounded by the number of blocks in the graph. It is given a (reference to) a block and a list (i.e., ordered sequence) of (references to) seen blocks, that is, blocks already encountered in the walk. Loop discovery on the graph starts with the opening block of the graph.

If the current block B is in the seen list, then the block is the beginning of a loop, and it is marked as a loop entry. All the blocks in the seen list, from its most current end back to the re-appearance of the current block, are added to that block's loops-via set.

Otherwise the block is not (yet known to be) a loop entry. Its label is added to the seen-sequence for a recursive walk to each follower. After all followers have been walked, for each block V in B's loops-via set, V's loops-via set must be added to B's, and B must be prepended to V's in-loops sequence if it is not already present.

Figure 6A:
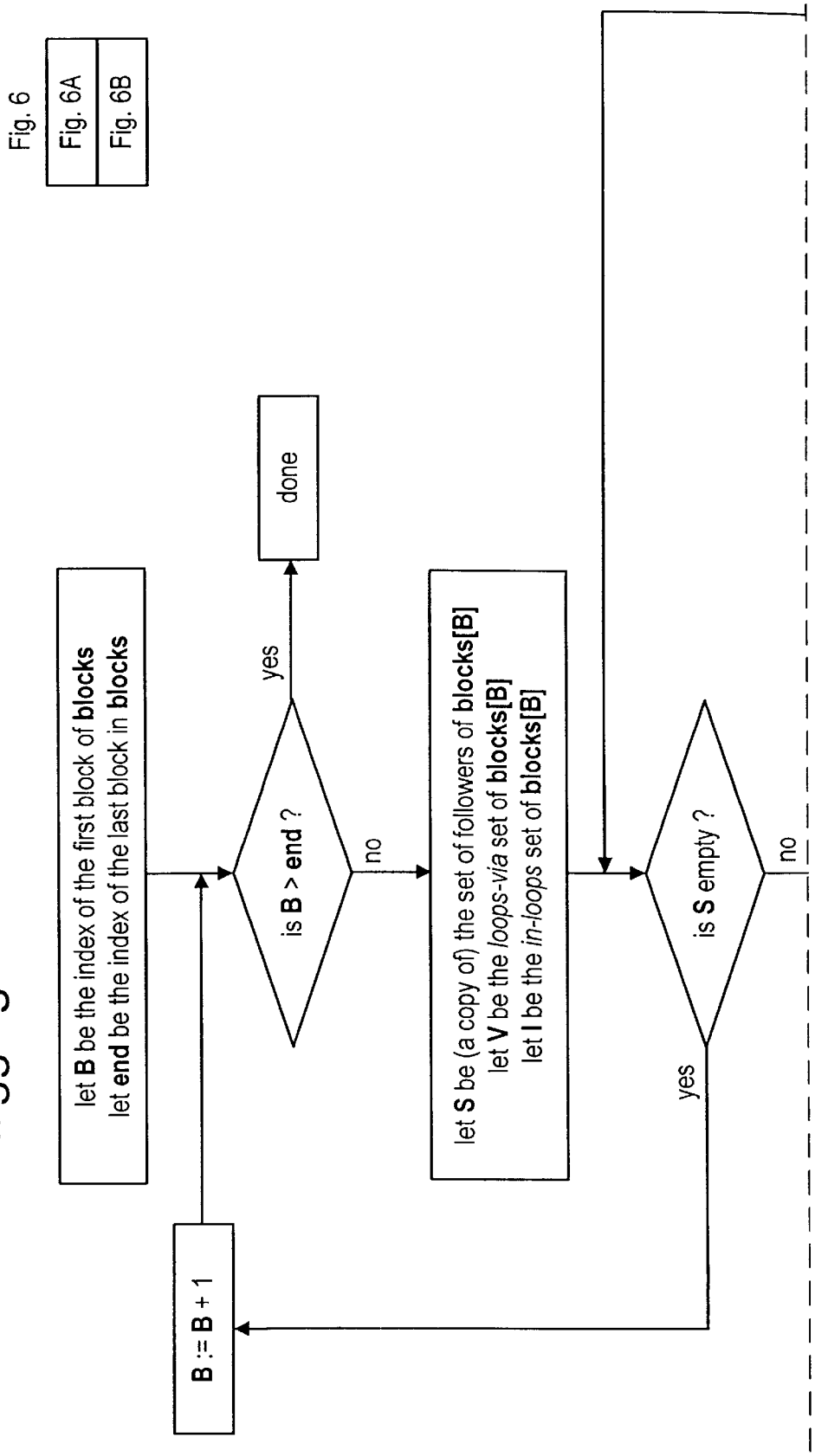
FIG. 6 is a flow diagram of the tagging operation of FIG. 2.
Figure 6B:
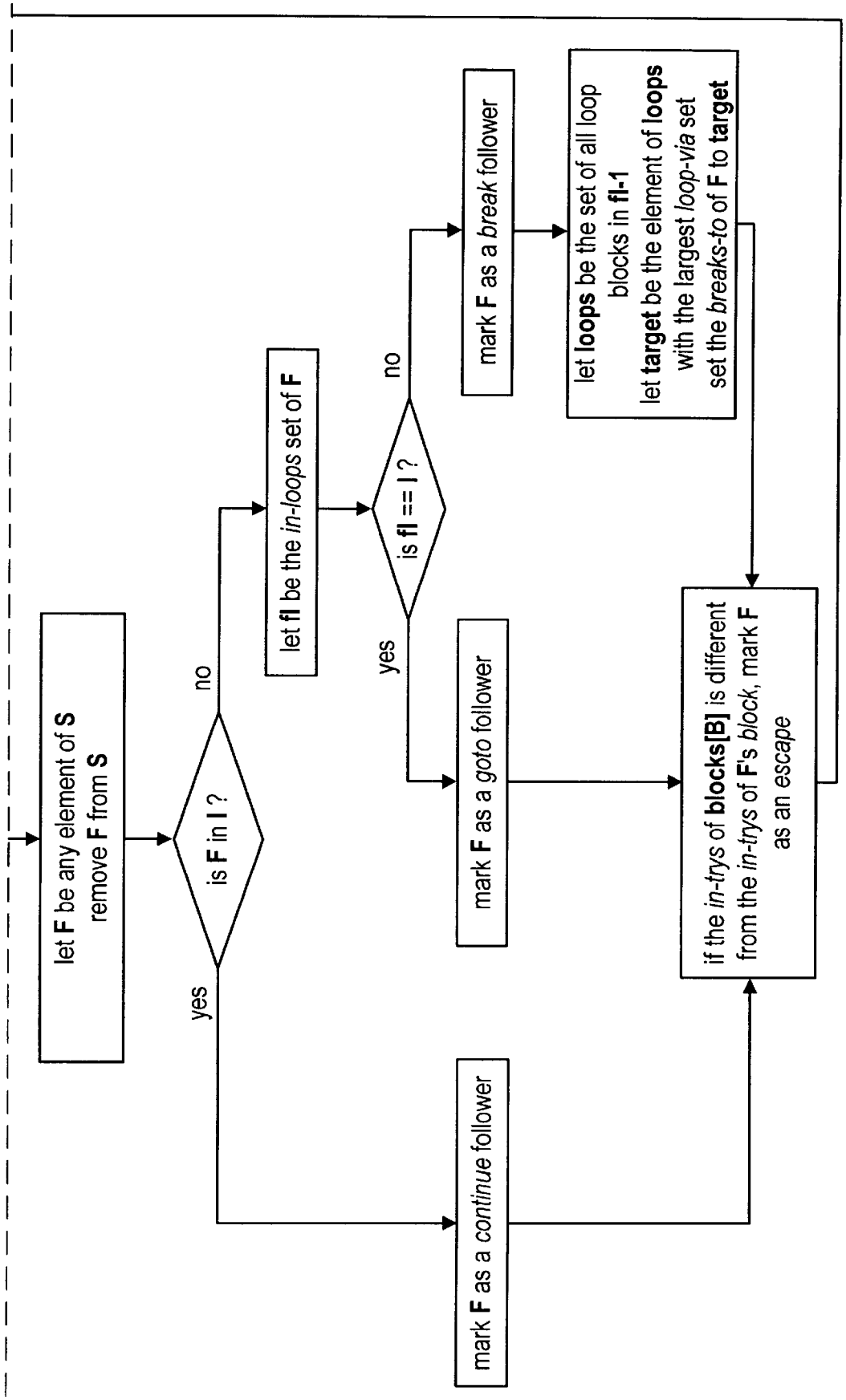
Figure 9A:
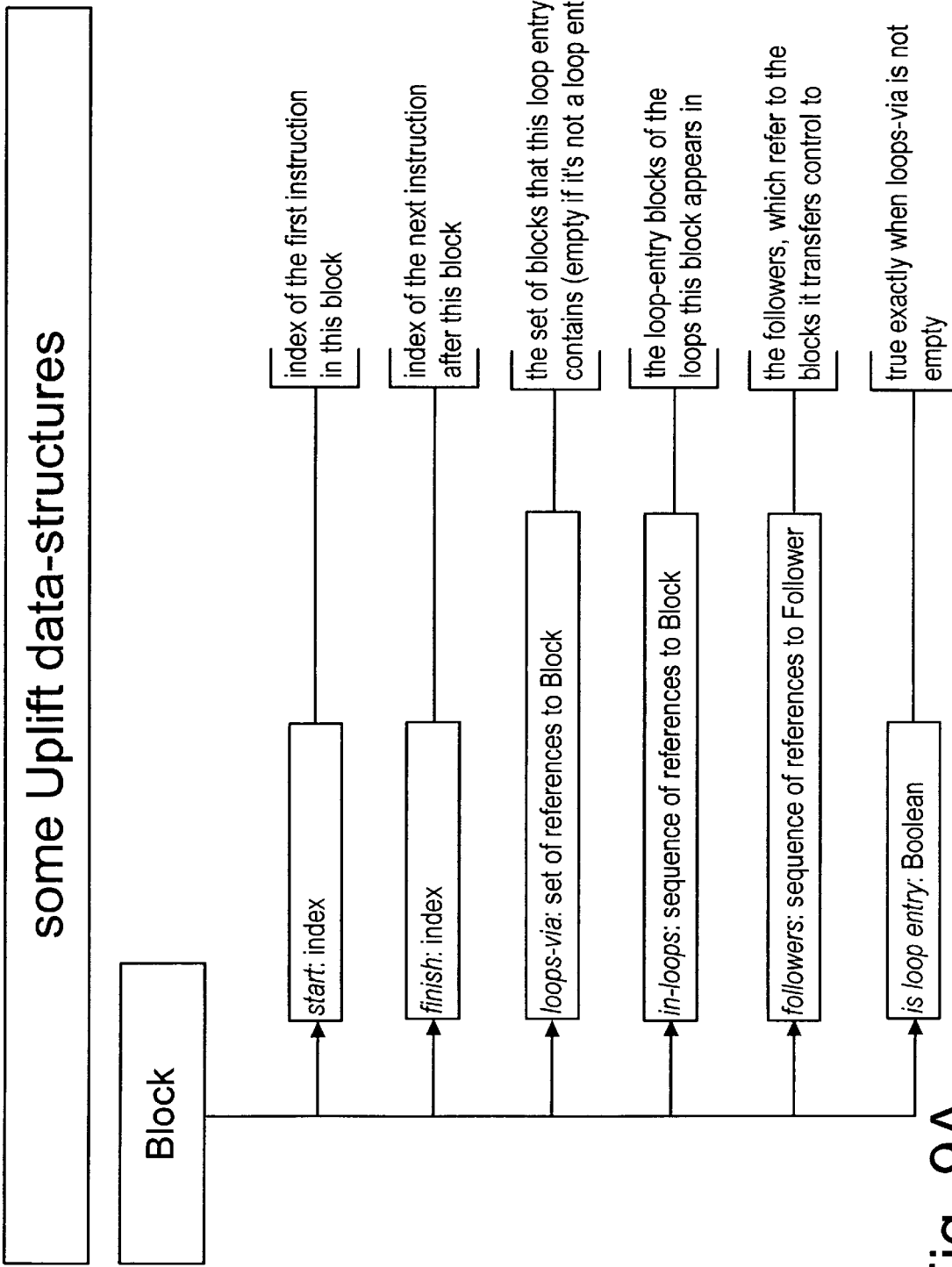
FIG. 9 is a block diagram of block and follower data structures used by the verification program of FIG. 1B.
Figure 9B:
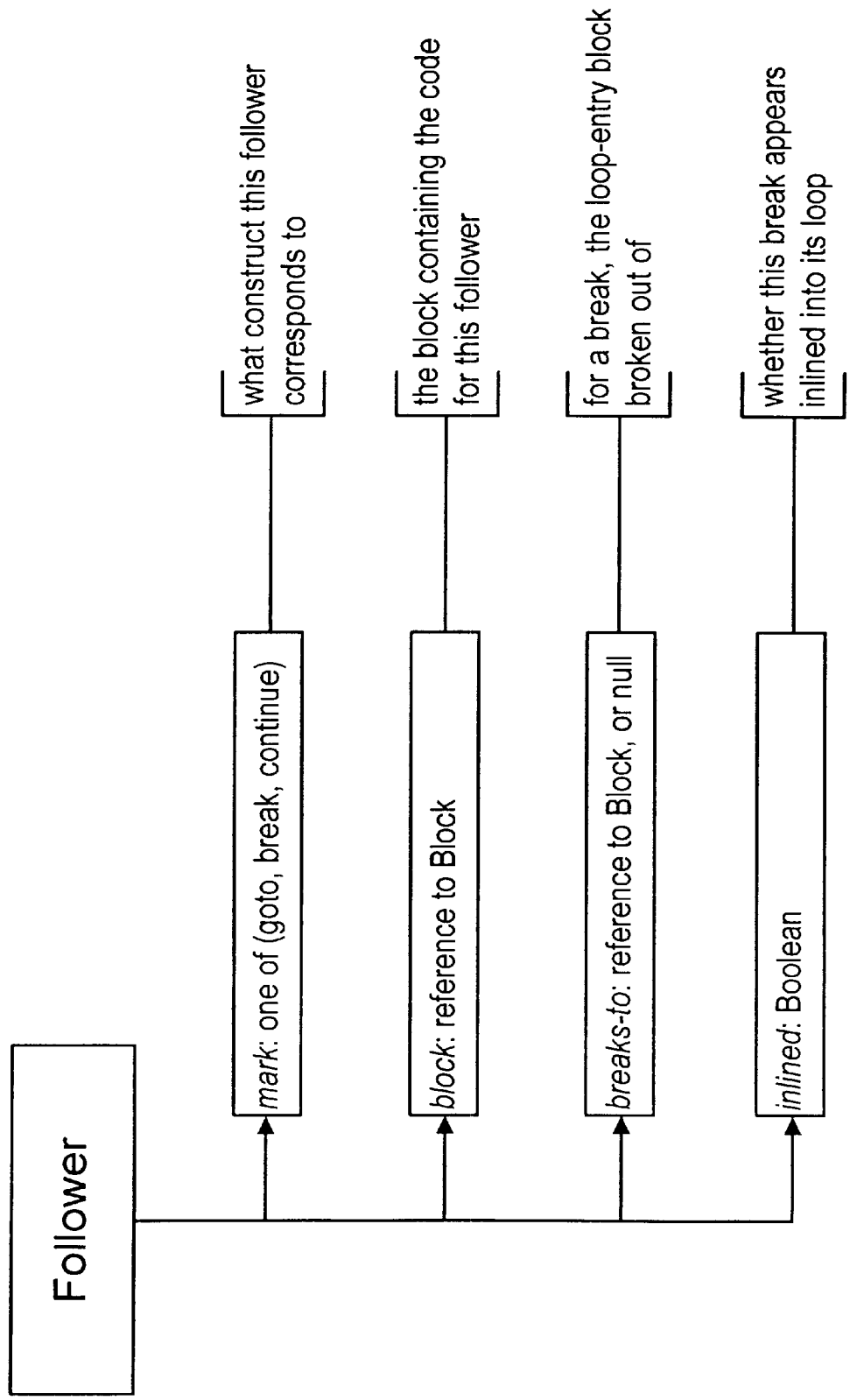

FIG. 6 illustrates a tagging pass of the method of FIG. 2. The tagging pass annotates the followers of each block with information about the type of transfer of control that it encodes.

The basic types are continue, break, and goto; any of these may be modified by the Boolean marker escape. A continue-follower is a transfer to a loop entry (as discovered in the previous pass); a break-follower is a transfer from the inside to the outside of a loop; and a goto-follower is a transfer which is neither a continue nor a break. A follower is an escape when it leaves the control of an exception-handler.

Break-followers are given a breaks-from attribute which will be the loop entry block of the loop from which they break.

Blocks can be tagged in arbitrary order, for example the order in which they appear in the initial code sequence; it is not necessary to do a graph-walk.

Each follower F(B) referring to block B of a block A is examined.

F is a continue-follower if B is in As in-loops set (in which case, B is automatically a loop-start).

F is a break-follower if the in-loops attribute L(B) of B is a proper subset of the in-loops attribute L(A) of A. F's breaks-from attribute is the "largest" loop-block in L(A)–L(B), where by "largest" is meant having the largest loops-via attribute.

Otherwise F is a goto-follower.

If A's in-trys is different from B's, then F is marked as an escape, because it crosses a try boundary.

FIGS. 7A and 7B illustrate a coarse structure pass of the method of FIG. 2. The coarse structure pass constructs the coarse structure of the tree, that is, the control structures but not the expressions; it contains only the nodes mentioned above plus "raw" nodes referring to blocks, and a set of breaks, references to blocks which are jumped to by breaks (these are collected during the graph walk).

The coarse tree is constructed recursively by walking the annotated blocks and constructing if, and, or, repeat, break, continue, sequence and switch nodes. The structure is given by the followers of the block (i.e., the annotations and the associated (referenced) blocks).

If a block has no followers, then its coarse tree is a raw node referring to that block, and its breaks is the empty set.

If a block has one follower (and does not end with a switch), then its coarse tree is a sequence of the raw node referring to that block and the coarse tree from structuring that follower; its breaks are the breaks from the follower.

If the block has two followers (and does not end with a switch), its coarse tree is a conditional node if(T,X,Y). The coarse tree T is a raw node referring to this block. X and Y are the coarse trees obtained by structuring the followers; the breaks is the union of the breaks from the followers.

If the block has n followers (because it ends with a switch), its coarse tree is a switch node switch(T,C). The coarse tree T is a raw node referring to this block; C are the coarse trees obtained by structuring each of the followers and annotating it with the appropriate case-label.

To avoid code duplication, the construction of a node if T then X; Q else Y; Q end if can and should be replaced by a sequence node if T then X else Y endif; Q.

ands and ors. To recover the use of and and or in the original code, certain patterns of code are recognized and replaced as follows:

if(C,if(D,T,F),F)) is replaced by if(C and D, T, F).
if(C,if(D,F,T),F)) is replaced by if(C and not D, T, F).
if(C,T,if(D,T,F)) is replaced by if(C or D, T, F).
if(C,T,if(D,F,T)) is replaced by if(C or not D, T, F).

If a block is a loop entry, then the coarse tree for the block is that described as above, wrapped in a repeat node, and all elements from the break-set removed from that set and made the second operand of the repeat node.

If, in addition, a block is marked as a catch-start, and X is the result from above, the result is atch (P) X where P is a new identifier node.

If, in addition, a block is marked as a try-block, hen the result is try X Y F where:

X is the result from above;
Let L be the list of blocks referred to by all the entries in the exception table which have this block as their start. Y is the collection of reconstructions of the blocks in L.
F is the reconstruction of the block, if any, whose first instruction is referred to by the jsr instructions which are in the address range started by this block (i.e., the code executed for finally).

A continue-follower F(A) constructs an coarse tree which is a continue node with A its operand, and with an empty break-set.

A break-follower F(A) constructs an coarse tree which is a break with A as one operand (to serve as a label) and the reconstruction of A as the other [discarding breaks], and with a break set which contains exactly A.

A goto-follower F(A) delivers the coarse tree and break-set obtained by reconstructing A.

FIGS. 8A–8C illustrate a fine structure pass of the method of FIG. 2. The AST is constructed by walking the coarse tree, maintaining a trail which is a sequence of AST nodes representing reconstructions that have not yet been incorporated into larger nodes. The trail is represented by a linked list and typically treated as a stack [i.e., elements may be pushed onto it and popped off it as necessary]. The structure of the fine tree is that of the coarse tree with missing details filled in.

When the reconstruction demands some number of nodes from the trail, but not enough nodes are available, reconstruction fails. (For diagnostic purposes, a verifier may supply the minimal number of illegal nodes and continue the reconstruction.)

The operation operands(N) is defined as acting on the trail, popping the minimal number of nodes such that the sum of their arities is at least N and returning those nodes as its result.

In the unusual case where the arity K of a node X is greater than 1, and that node is required to satisfy operands (N) but the total arity would be greater than N, a sequence S of length K of new variables is created and the node replaced by the sequence $(S:=X; S_1; \ldots; S_K)$ (i.e., the node is split into component variables).

The coarse tree is reconstructed by reconstructing its nodes. For a node that is a block of instructions, the instructions are processed in sequence, each modifying the state of the trail. A sequence node is reconstructed by reconstructing each of its elements in turn, modifying the trail.

A repeat node is reconstructed by reconstructing its body with the empty trail and then pushing the new repeat node (built from the reconstructed body) onto the trail. (The restriction to the empty trail corresponds to Java loops not affecting the operand stack; more sophisticated analysis, e.g. using additional passes to estimate how deep the trail should be, may make it unnecessary.)

At this point, each break within the repeat carries with it its "continuation", the code it would execute next. We may perform a transformation: pick one break block B from the break-set of the coarse repeat. Replace the constructed loop R with R'; B' where B' is the reconstruction of the block B and R' is R with break N replaced by break.

For correctness it does not matter which of the possible blocks B are picked. However, if several of the breaks share the same B then that would be a preferred choice; otherwise the first one is a good choice (because it's the one that would be generated by simple compilation of a Java while-loop).

A catch (P) X node is reconstructed by reconstructing X on a trail [P] to give newX and pushing catch (P) newX onto the trail.

A node if(T, X, Y) is reconstructed by reconstructing T, acquiring the test T' using operands(1), reconstructing X and Y to X' and Y', both with the empty trail [see above], and then pushing if(T',X',Y') onto the trail.

The reconstruction process for various instructions is now described. To aid in reconstruction, sequence of instructions may be "peephole reorganized" by recognizing common idioms and replacing them by more convenient ones.

For example, in a stack machine, the sequence dup; store L may be replaced by store L; load L to assist in recognizing sequenced assignments of the form L1=L2=E.

Note that this changes the stack-use and must be accommodated if checking that the stack depth actually used corresponds to some declared use; this can be accomplished by adding extra pseudo-instructions to the code (and nodes to the tree).

A push instruction is reconstructed by pushing a leaf node representing the operand X onto the trail.

A swap instruction where the top two elements of the trail each have out-arity 1, and neither node has side-effects that might influence the other, is reconstructed by replacing the top two elements X, Y of the trail by single(Y), single(X).

The single node will type-check only if the type of its operand represents types that will fit into a single word (i.e., not double or long). This enforces the JVM restrictions on swap.

Otherwise we acquire (X, Y)=operands(2), allocate new temporary variables Vx and Vy, and append in turn assign (Vy, Y); assign(Vx, X); Y; X onto the trail.

Our conservative definition of "influence" is as follows.

One node A influences another node B if (1) A contains an assignment to a local variable or static variable x referred to in B or (2) A contains a procedure call and B contains a procedure call or a reference to a static variable or any array indexing or field access.

A dup instruction where the top argument X of the trail has out-arity 1, and that argument is "sufficiently simple", is reconstructed by replacing the top of the trail by single(X), single(X). (single serves the same purpose as in swap; to make sure that multi-word values and single-word values are not confused.), "sufficiently simple" is any constant or immutable variable.

Otherwise a new temporary local variable V is allocated and the top of the trail is replaced by V:=single(X); V; V.

A general n-adic operation (such as add or negate) that would take some number of operands off the operand stack and replace them by some number of results is reconstructed by:

determining the tag of the AST node that corresponds to this operation;

acquiring operands(outArity(tag));

constructing a node with the given tag and the popped operands;

finally pushing the new node back onto the trail.

An instruction pop Y (e.g., a JVM storeI) is reconstructed by constructing an assignment node whose target is the operand described by Y and whose source is obtained by operands(1). This new node is then pushed onto the trail.

A conditional jump is reconstructed into a relation by acquiring the operands X and Y with operands(2) and constructing the node dyadic X op Y.

Similarly, an instruction such as storeArray which takes an reference to an array, an index value, and a value to store from the stack, or putField which takes an object reference, a (static) offset, and a value to store, construct assignment nodes whose source is obtained by operands(1) and whose target is an array-indexing or selection node whose operands have been similarly obtained in an appropriate order.

Auxiliary variables may be introduced to make the ordering explicit.

An instruction call P where P refers to a procedure (method, function, operator, etc) is reconstructed by:

determining the number of argument values N that P requires. Typically this is determined by consulting information held elsewhere for P, although this may also be embedded in the call instruction or have been left on the run-time stack.

constructing a new call node with callable P and argument list operands(N).

pushing this node onto the trail.

The instruction new C, where C is a reference to a class (otherwise verification fails), generates a basicNew C node. This node is a placeholder that should be transformed away (see the next section).

The instruction multianewarray C K, where C describes a class, obtains K operands I using operands(K) and appends the node new $C[I_1] \ldots [I_K]$ to the trail.

The instruction newarray C, where C describes a type, obtains an operand N using operands(1) and appends the node new C[N] to the trail. (Thus it is a special case of multianewarray.)

The method of FIG. 2 will reconstruct the same node multiple times (whenever control flow joins). To avoid this expense, each block can be associated with its reconstruction; when the block is reconstructed again, the associated tree nodes can be immediately returned.

It is possible for the block to be reconstructed in different trail contexts (when it reconstructed following the then and else branches of an if, for example). Thus each block should have several associated reconstructions, keyed from the trail.

The method of FIG. 2 may reconstruct "non-standard" nodes (i.e., nodes that do not correspond closely to expected source). For example, the repeat node will be reconstructed if the source language used for, while, etc.

It may also have duplicated code (for example, the then and else parts of an if may have common tails).

Canonization is the process of recognizing commonly-occurring shapes of tree and duplications and simplifying them.

An AST node if E then P; Ptail else Q; Ptail endif is replaced by an AST node if E then P else Q endif; Ptail.

An AST node repeat E endrepeat where E contains break $E_i$ nodes is replaced by repeat E endrepeat; $E_j$ where $E_j$ is one of the $E_i$ and break $E_j$ is replaced by break. The choice of j doesn't much matter for correctness, but as a heuristic for trying to match the original source, if several breaks have equal $E_j$ then it's best to pick that $E_j$; otherwise pick the first break. The other break $E_k$ are replaced by $E_k$; break.

An AST node repeat if E then break endif; G endrepeat is replaced by while not E do G end while.

The node not not E is replaced by E. The node not (X Rel Y), where Rel is a relational operator, is replaced by X Rel' Y where Rel' is the complement operator of Rel. The nodes not (X and Y) and not (X or Y) are replaced using de Morgan's laws.

The tree verification process is the checking that must take place on the reconstructed fine tree. Tree verification may be thought of as an extended type-checking; it computes (and checks) the type of a node, and may check other conditions too.

The verification of the tree follows the rules that are laid down for the verification of the original code sequence, but transformed "backwards" in the same way that the tree was transformed from the code. [For languages which compile into code designed for them, verification reduces to applying the rules. for the source language.]

The general model for tree verification is:

(recursively) check the operands of the current node; this delivers their types.

perform a node-specific check, usually on the types of the operands (sometimes a more detailed structural check is needed).

deliver the resulting type of this node.

Consider the rules for the nodes of the tree. In what follows, the type None is used to record a failure to find a suitable type. The return type of the current method is mT and the set of types it throws is throwt; the set of types "currently caught" is catchT, which starts out as throwT.

The type Constructor is returned only by by calls to constructor functions.

The verification process uses a small number of types, slightly more general than is visible to the Java programmer as types.

The void type Void.

the primitive types: Bool, Byte, Char, Short, Int, Long, Float, and Double.

array types, array T where T is a type.

the reference types: class N where N is a class name, or any array type. In particular there are the types Object, Null, and String.

the field types field C T where C is a class type and T any type.

the method types static C(A) R and dynamic C (A) R which expresses a method with argument types A and result type R belonging in class C. A is a multiple type, which is a sequence of types.

The error type None and the special type Constructor.

$T_1$ accepts $T_2$ if $T_1$ is the same type as $T_2$ or $T_1$=array $U_1$, $T_2$=array $U_2$, and $U_1$ accepts $U_2$ or $T_1$ and $T_2$ are both class types and $T_2$'s class is a subclass of $T_1$'s class or $T_1$ and $T_2$ are both multiple types of the same length, and elements of $T_1$ accept corresponding elements of $T_2$.

$T_1$ is consistent with $T_2$ if $T_1$ equals $T_2$ or $T_1$ is Object and $T_2$ is any reference type.

$T_1$ is the same type as $T_2$ if they are the same primitive type or they are both class C or they are array $U_1$ and array $U_2$ and $U_1$ is the same type as $U_2$ The GCS of $T_1$ and $T_2$ is $T_1$ if $T_1$ is the same type as $T_2$ array U if $T_1$ is array $U_1$, $T_2$ is array $U_2$, and U is the GCS of $U_1$ and $U_2$ class C if $T_1$ is class $C_1$, $T_2$ is class $C_2$, C is a supertype of $C_1$ and $C_2$, and no subtype of C is a supertype of both $C_1$ and $C_2$.

The verification rules are applied by recursively walking the tree and using straightforward type-checking technology, with the exception of handling local variables.

Each method-local slot may be correctly used at different types, because (for example) it may implement variables of different types in non-nested scopes:

if (P) { $T_1$ x=$E_x$; ... use x ... } else { $T_2$ y=$E_y$; ... use y } x and y are likely allocated the same local variable position.

To handle this unfortunate situation, the tree-walk takes a parameter bindings, which records the binding of each local variable to its current type. When control flow forks, bindings reflects this. See the descriptions below on if, loop, assign, and local nodes for details; where not explicitly specified, bindings is passed to each subordinate recursive walk and the subordinates are visited in execution order.

The body B of a method M in class C is verified by verifying B and checking that its type is Void.

In addition, if M is a constructor, B must start with a constructor call to a constructor of either (a) C itself or (b) the parent of C.

sequence S1; S2

(two-element sequences are described; sequences of more elements follow the obvious generalization.)

S1 and S2 are verified to give their types tS1 and tS2. The type tS1 must be Void; the result type is tS2.

dyadic operators, L op:T R

L and R are the children of the node, op is the operator, and T is its type. L and R are verified to get types tL and tR.

For +, −, *, /, %, the types tL, tR, and T should all be the same type, and the result type is T.

For &, |, ^, the types tL, tR, and T should all be the same integral type, and the result type is T.

For <<, >>, >>>, the types tL and T should be the same integral type, tR should be Int, and the result type is T.

For ==, !=, <=, <, >, >=, the types tL, tR, and T should be the same type, and the result type is Bool.

For && and ||, the types tL, tR, and T should all be Bool.

monadic operators, op:T R

R is the operand of the node, op the operator, and T the type of the operator. R is verified to get its type tR. T and tR should be the same type, and the result type is T; otherwise, verification fails.

conditionals, if P then L else R endif

P, L, and R are verified to get their types tP, tL, and tR. L and R are passed equal copies of bindings as it is after P is verified; bindings is then modified to be the intersection of L's and R's bindings (ie each variables type is replaced by the greatest common supertype of it's binding from L and R).

tP must be Bool.

Let T be the greatest common supertype of tL and tR, if one exists, and None otherwise. If T is None, verification fails. Otherwise, the result type is T.

loops, loop X B endloop

X is the loop label; it plays no part in the verification. A copy S of bindings is saved, and B is verified to get its type tB. For each variable v in the saved bindings S, the type of v in S must accept the (new) type of v in bindings.

If tB is Void, the result type is Void. Otherwise verification fails.

loops, while X P B endloop

X is the loop label; it plays no part in the verification. P and B are verified to get their types tP and tB; bindings is handled as for loop ... endloop.

P must be Bool, otherwise verification fails. If tB is Void, the result type is Void. Otherwise verification fails.

loops, break & continue

No operands need to be checked. The result type is Void.

returns, return

There are no operands to check. The result type is Void.

returns, return:T E

E is the expression whose value is to be returned, and T is the type given in the return. E is verified to get its type tE.

mT should be consistent with T and accept tE. The result type is Void.

calls, (dynamic) X.F(A)

X is an object, F one of its methods, and A is an argument list. X, F, and A are verified, obtaining their types tX, tF, and tA. (Note that tA is a multiple type, not a single type.)

tF must be a dynamic method type of a class C that accepts X. The argument type of tF must accept the type aT.

The result type is the result type of tF.

calls, (static) F(A)

F is a method of some class, and A is an argument list. F and A are verified, obtaining their types tF and tA. tF must be a static method type of a class C and the argument type of tF must accept tA. The result type is the result type of tF.

calls, (special) X.F(A)

As for the dynamic case, except that if F is <init>, the result type is Constructor.

new, new C P(A)

The expression C must type-check to a class and P must type-check to a constructor of that class. The arguments A must type-check to a type accepted by the argument type of P.

The result type is the class type of C.

new, newArray C[N$_1$] ... [N$_k$]
: C must type-check to a type T which is either a class type which has a constructor with no arguments, or a primitive type. Each N$_i$ must type-check to a type accepted by int.

The result type is array^k T (ie array T if k=1, array array T if k=2, etc).

conversions, cast:T E
: T and E are verified to give their types tT, tE. (Note that T is a type name, not a general tree.)

The result type is tT. tE must be a reference type, otherwise verification fails.

conversions, convert T$_1$ T$_2$ E
: T$_1$ and T$_2$ must be non-reference type names. E is verified to obtain its type tE, which must be T$_2$. The result type is T$_1$.

assignments, L=R and L :=R
: L and R are verified to obtain their types tL and tR; tL must accept tR. The result type is Void for :=and tL for +=.

If L is a local variable, then its current type is irrelevant, and its bound type becomes tR.

assignments, L op=R and L op:=R
: L and R are verified to obtain their types tL and tR. tL and tR must be non-reference types. The same rules as for dyadic operators (above) are used to obtain a result type T; L must accept T. The result type is as for ordinary assignment.

switches, switch( E, Cs
: E is verified to obtain its type eT, which must be accepted by Int.

Each of the cases Cs is verified to obtain its type; the result type is the greatest common supertype of all those types (which will usually be Void).

cases, case(E, X)
: E is verified to obtain its type eT, which must be accepted by Int. X is verified to obtain its type xT, which is the result type.

default, default(X)
: X is verified to obtain its type xT, which is the result type.

try-blocks, try L catching C finally F endtry
: L and F are verified to give types tL and tF, both of which must be Void. During the verification of L, catchT is augmented to include all the caught exception types in C.

The catching C is a collection of catch nodes, which are verified. Their types are irrelevant.

catch clause catch (C) B
: C is a type; it must be accepted by the type Exception. B is verified to obtain its type, which must be Void. The result type is None.
XXX issue: the argument. how is it constructed?

throw E
: E is verified to obtain its type tE. tE must be a reference type that is a sub-type of Exception and which is accepted by at least one type in catchT, otherwise verification fails.

literals, lit:T L
: T is the type of the literal, which is a non-reference type or String; the result type is T.

identifiers, Local L
: The type of a local is that currently recorded in bindings. If there is no such type, verification fails.

identifiers, Static S
: The result type is the type tS of S as found from the description in the constant pool.

identifiers, Field F
: The result type is field tF where tF is the type of F as found from the description in the constant pool.

identifiers, Method M
: The result type is method tM where tM is the type of M as found from the description in the constant pool.

accessors, A[I]
: A and I are verified for their types tA and tI. tI must be Int and tA must be array T for some type T. The result type is T.

accessors, X.F
: X and F are verified for their types tX and tF. X must be a reference type for some class C and tF must be a field type for that class; the result type is the type of F in C.

ad-hoc details

The JVM has no Bool type, representing boolean values as small integers; thus 1 has type int but is a legal boolean. This is dealt with by introducing subtyping; 1 (and 0) have type Bool, but Bool is a sub-type of int and so can be used for value everywhere an int can. (However, only Bool values can be used as arguments to procedures expecting java.lang-.bool parameters; note also that if both arguments of integer (strictly, bitwise) and and or type Bool the result is also of type Bool.)

Some nodes have special non-type rules (e.g., the rule that forbids a constructor to access instance variables until they have been assigned to); the tree provides a natural structure on which to hang these checks.

FIG. 10 shows a Java program containing a method main whose body consists of two nested loops with various conditional break and continue commands. The intent of the example is to show that complex control structures can be recovered using the method of FIG. 2, and to show the steps of the reconstruction process.

FIG. 11A shows the result of applying the reassembly pass of the method of FIG. 2 to the JVM bytecodes for main. (The bytecodes are obtained by passing the Java source of FIG. 10 through a Java compiler and extracting the bytecode component from the resulting class file.)

The digits before the brackets represents the offset of the bytecode from the beginning of the bytecodes, sometimes known as the jpc (Java program counter). The different between successive jpc values is the width in bytes of the JVM instruction between the two jpcs. The figure in brackets is the index of the reassembled instruction.

The text following the instruction is [a human-readable representation of] the reassembled instruction; sometimes details have been omitted in this printing (eg the operand of the bipush instruction). Each branch instruction of the reassembly is annotated with the indexes of the targets of the branch; note that (e.g., at jpc 12) conditional branches are annotated with both the index for the case when the condition succeeds (18 in this case) and when it fails (15) (i.e., the instruction "falls through").

Since reassembly has succeeded, the bytecode sequence (in the class file) does not perform illegal steps such as jumping into the middle of instructions or out of the method body.

FIG. 11B shows the result of the blocking, loop discovery and tagging passes of the method of FIG. 2 applied to the reassembly pass of FIG. 11A.

The digits before the brackets is the jpc of the bytecode at which this block starts, and the figure within the brackets is the number of (reassembled) instructions included within that block. For example, the block starting at 24 is one instruction long, a single branch to 45. The block starting at 45 is itself one instruction long, a single iinc (it does not continue further as a new block starts at jpc 48 because of the branch at jpc 7).

Following the arrow are the followers of the block, if any (the block at jpc 63 has none because it ends with a return) represented by their jpc value followed by a letter indicating the kind of transfer of control: R for a continue, B for a break, and G for a goto. Thus the block at jpc 0 has a single follower, a goto jpc 57, while the block at jpc 36 has two, a goto jpc 45 and a break jpc 42.

After the followers is the loop information (from which the annotations on the followers is inferred) if any, denoted by L: followed by the jpcs of the loop starts of the loops in which this block is involved. Again considering the block at jpc 36, it is within the body of two loops, starting at the blocks with jpcs 57 and 48 respectively. Since loop discovery has succeeded, these two loops must be properly nested, one within the other.

The blocks 57 and 48 which are these loop starts are additionally annotated, following via:, with all the blocks which form their loop body(s) as found by the loop discovery phase of the algorithm. All the blocks of 48 are included in the blocks of 57, which means that 48 corresponds to the innermost (j) loop of FIG. 10.

Figure 11C:
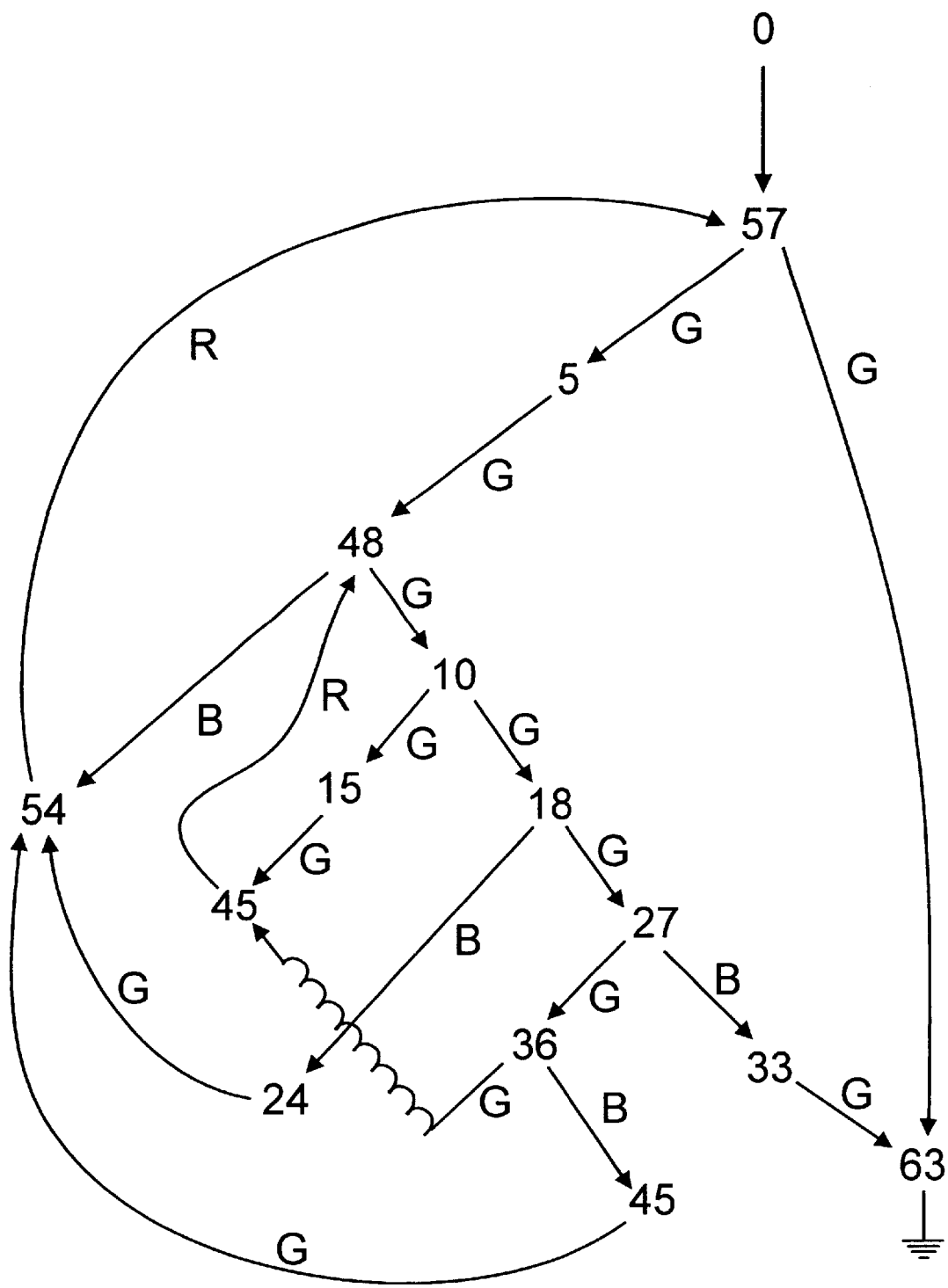
FIG. 11C is a graph of loop entry points and tags extracted from the instructions of FIG. 11A and the blocks of FIG. 11B.

FIG. 11C shows the same information as FIG. 11B, represented as a graph.

The nodes of the graph are blocks, represented by their jpc value; an arc leads from a node to its followers. The arc is labeled with G for a goto, B for a break, and R for a repeat (continue).

The node 63 is the exit from the method; it has no followers (thus it is "grounded"). The arc from 36 to is curled purely because it crosses the arc from 18 to 24. The graph representation makes it clear that 48 and 57 are loop entry points.

FIG. 11D is a representation of the results of the coarse structure pass of the method of FIG. 2 applied to the block structure of FIG. 11B.

The number at the left is the index of the coarse tree node. The | and % signs are an aid to the eye in grouping the children of a node; the node kind is the word following a − sign, and its children are indented underneath it.

Thus the whole tree is a SeqNode (0) with two children, a RawBlockNode (1) and a LoopNode (2). There is an IfNode (16) with its three children: a RawBlockNode (17), a SeqNode (18), and a BreakNode (21). Raw block nodes are annotated with the block (and jpc) which they originated at.

FIG. 11E is a representation of the results of the fine structure pass of the method of FIG. 2 applied to the coarse tree of FIG. 11D; all the remaining operator-operand structure has been recovered. For example, the IfNode (5) has a first child which is DyadicNode (6) with operator < and two operands LocalIdNode (7) (an int variable at offset 1) and LiteralNode (8) (an integer constant 10).

FIG. 11F is an alternative representation of the results of the fine structure pass, where the operands of a dyadic operator appear on a single line with that operator. In addition, the condition of an IfNode appears on the same line as that IfNode; for example the node 2 is the same piece of tree as the preceding paragraph's IfNode (5). Literal nodes re represented by their literal value and local identifiers by $n where n is their index number.

Figure 12:
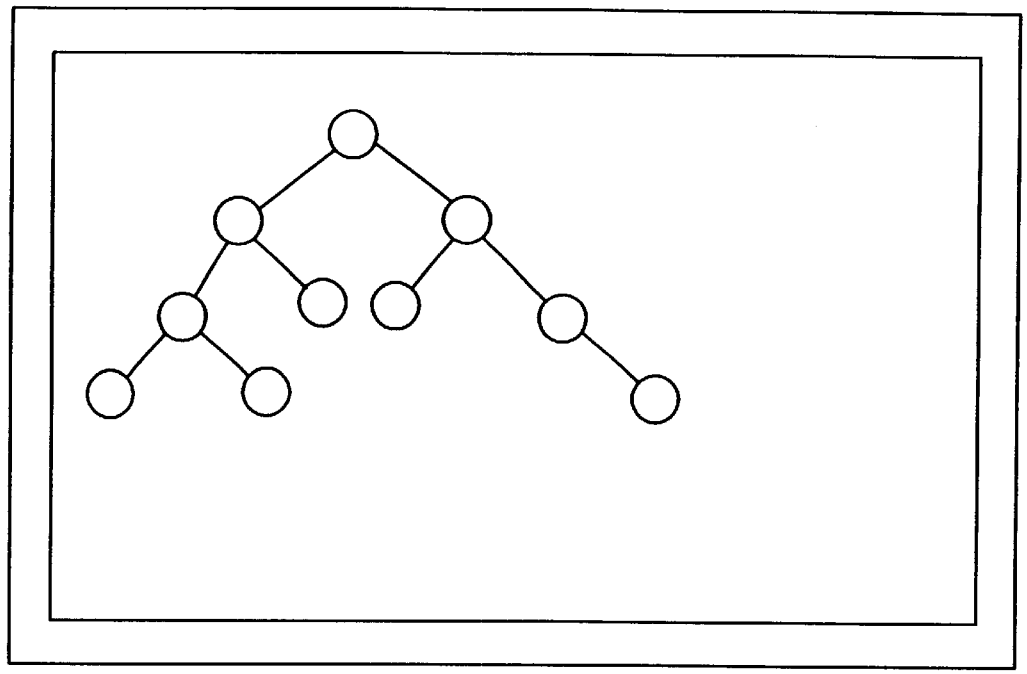
FIG. 12 shows a graphical representation of an abstract syntax tree generated in accordance to an embodiment of the invention.

FIG. 12 shows a graphical representation of an abstract syntax tree generated by method 200 (FIG. 2). The graphical representation of the abstract syntax tree may used to facilitate further exploration of the control structure of the corresponding code sequence. For example, icons such as the ones shown in FIG. 12 may be employed to represent the nodes and branches of the abstract syntax tree. A user can then inspect pcific portions of the tree by clicking on a articular node of the tree.

The graphical representation of the tree may also provide more advanced features, such as allowing the user to modify the structure of the abstract syntax tree by performing point and click operations on the graphical representation of the tree.

Figure 13:
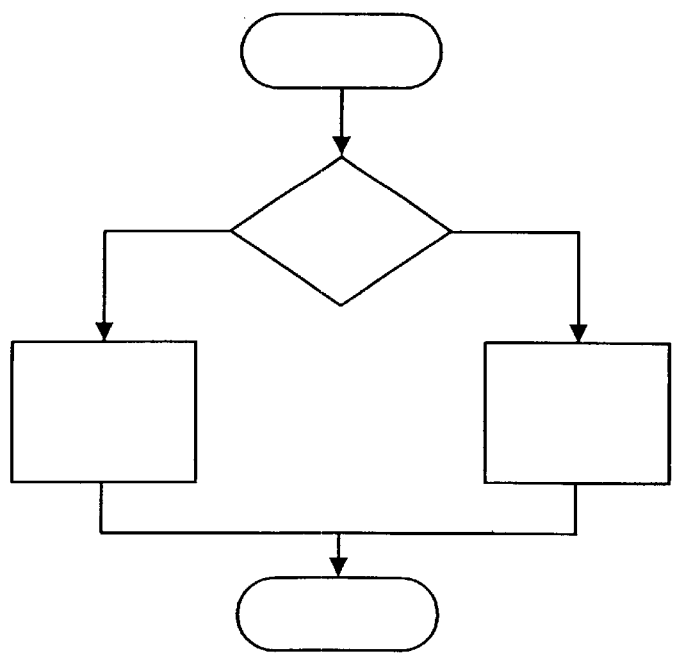
FIG. 13 shows a flow diagram generated from an abstract syntax tree, in accordance to an embodiment of the invention.

FIG. 13 shows a flow diagram generated from an abstract syntax tree generated by the method 200 (FIG. 2). The flow diagram of the abstract syntax tree may used to facilitate further exploration of the control structure of the corresponding code sequence.

Embodiments described above illustrate, but do not limit the invention. In particular, the invention is not limited to any particular hardware/software implementation. In fact, hardware, software, or any combination thereof other than those described herein may be used in accordance to the principles of the invention.

We claim:

1. A method for verifying a code sequence to be executed on a computer, the method comprising:

constructing an abstract syntax tree from the code sequence; and determining whether the abstract syntax tree satisfies a predefined set of conditions, wherein the predefined set of conditions is indicative of the code sequence being executable on the computer without generating a predefined class of execution errors.

2. The method of claim 1, wherein constructing the abstract syntax tree further comprises:

reassembling the code sequence into a plurality of instructions;

combining the instructions into a plurality of blocks;

examining the blocks to determine entry points of a plurality of loops; and tagging locations in the series of instructions where control is transferred at the end of each loop.

3. The method of claim 2, wherein constructing the abstract syntax tree further comprises:

examining the instructions, the blocks, the loops and the tagged locations to generate a plurality of control structures; and examining the instructions, the blocks, the loops, the tagged locations and the control structures to generate a plurality of form expressions.

4. The method of claim 1, further comprising analyzing the abstract syntax tree to optimize the code sequence.

5. The method of claim 1, further comprising using the abstract syntax tree to generate recompiled source code from the code sequence.

6. The method of claim 1, further comprising adding tracing or debugging code segments to the code sequence at run time based on code abstract syntax tree.

7. The method of claim 1, further comprising adding resource monitoring code segments to the code sequence at run time based on the abstract syntax tree.

8. The method of claim 1, further comprising displaying a structure of the abstract syntax tree in graphical form.

9. The method of claim 1, further comprising generating a flow diagram from the abstract syntax tree representing a control flow of the code sequence.

10. The method of claim 1, further comprising analyzing the abstract syntax tree to ensure compliance of the code sequence with a set of predefined coding specifications.

11. A computer system connected to the Internet and executing a computer program for verifying computer code sequences downloaded from the Internet, the computer program comprising computer instructions for:

constructing an abstract syntax tree from the code sequence; and determining whether the abstract syntax tree satisfies a predefined set of conditions, wherein the predefined set of conditions is indicative of the code sequence being executable on the computer without generating a predefined class of execution errors.

12. The computer system of claim 11, wherein the computer instructions for constructing the abstract syntax tree further comprise computer instructions for:

reassembling the code sequence into a plurality of instructions;

combining the instructions into a plurality of blocks;

examining the blocks to determine entry points of a plurality of loops; and tagging locations in the series of instructions where control is transferred at the end of each loop.

13. The computer system of claim 12, wherein the computer instructions for constructing the abstract syntax tree further comprise computer instructions for:

examining the instructions, the blocks, the loops and the tagged locations to generate a plurality of control structures; and examining the instructions, the blocks, the loops, the tagged locations and the control structures to generate a plurality of form expressions.

14. The computer system of claim 11, wherein the computer program further comprises computer instructions for analyzing the abstract syntax tree to optimize the code sequence.

15. The computer system of claim 11, wherein the computer program further comprises computer instructions for using the abstract syntax tree to generate recompiled source code from the code sequence.

16. The computer system of claim 11, wherein the computer program further comprises computer instructions for adding tracing or debugging code segments to the code sequence at run time based on the abstract syntax tree.

17. The computer system of claim 11, wherein the computer program further comprises computer instructions for adding resource monitoring code segments to the code sequence at run time based on the abstract syntax tree.

18. The computer system of claim 11, wherein the computer program further comprises computer instructions for displaying a structure of the abstract syntax tree in graphical form.

19. The computer system of claim 11, wherein the computer program further comprises computer instructions for generating a flow diagram from the abstract syntax tree representing a control flow of the code sequence.

20. The computer system of claim 11, wherein the computer program further comprises computer instructions for analyzing the abstract syntax tree to ensure compliance of the code sequence with a set of predefined coding specifications.

21. A computer-readable storage medium comprising a computer program for verifying computer code sequences downloaded from the Internet, wherein the computer program comprises computer instructions for:

constructing an abstract syntax tree from the code sequence; and determining whether the abstract syntax tree satisfies a predefined set of conditions, wherein the predefined set of conditions is indicative of the code sequence being executable on the computer without generating a predefined class of execution errors.

22. The computer-readable storage medium of claim 21, wherein the computer instructions for constructing the abstract syntax tree further comprise computer instructions for:

reassembling the code sequence into a plurality of instructions;

combining the instructions into a plurality of blocks;

examining the blocks to determine entry points of a plurality of loops; and tagging locations in the series of instructions where control is transferred at the end of each loop.

23. The computer-readable storage medium of claim 22, wherein the computer instructions for constructing the abstract syntax tree further comprise computer instructions for:

examining the instructions, the blocks, the loops and the tagged locations to generate a plurality of control structures; and examining the instructions, the blocks, the loops, the tagged locations and the control structures to generate a plurality of form expressions.

* * * * *